United States Patent
Inoguchi et al.

(10) Patent No.: US 10,632,994 B2
(45) Date of Patent: Apr. 28, 2020

(54) VEHICLE TRAVEL CONTROL APPARATUS

(71) Applicant: TOYOTA JIDOSHA KABUSHIKI KAISHA, Toyota-shi, Aichi-ken (JP)

(72) Inventors: Takeshi Inoguchi, Chiryu (JP); Keiji Yamashita, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 15/716,969

(22) Filed: Sep. 27, 2017

(65) Prior Publication Data

US 2018/0118208 A1 May 3, 2018

(30) Foreign Application Priority Data

Nov. 1, 2016 (JP) ................... 2016-214557

(51) Int. Cl.
| | |
|---|---|
| *B60W 30/14* | (2006.01) |
| *B60W 50/14* | (2020.01) |
| *B60W 50/08* | (2020.01) |
| *B60W 50/00* | (2006.01) |

(52) U.S. Cl.
CPC ........ *B60W 30/143* (2013.01); *B60W 50/085* (2013.01); *B60W 50/14* (2013.01); *B60K 2310/244* (2013.01); *B60W 2050/0063* (2013.01); *B60W 2050/146* (2013.01); *B60W 2420/42* (2013.01); *B60W 2540/215* (2020.02); *B60W 2555/60* (2020.02)

(58) Field of Classification Search
CPC .. B60W 30/143; B60W 50/14; B60W 50/085; B60W 2540/04; B60W 2050/0063; B60W 2310/244; B60W 2420/42; B60W 2050/146; B60W 2550/22
USPC ........................................... 701/93
See application file for complete search history.

(56) References Cited

U.S. PATENT DOCUMENTS

| | | | |
|---|---|---|---|
| 6,226,588 B1 | 5/2001 | Teramura et al. | |
| 2010/0217494 A1* | 8/2010 | Heft | B60T 7/22 701/70 |
| 2010/0321176 A1* | 12/2010 | Hofmann | B60K 35/00 340/438 |
| 2012/0253628 A1 | 10/2012 | Maruyama | |

(Continued)

FOREIGN PATENT DOCUMENTS

| | | |
|---|---|---|
| JP | 2000-118263 A | 4/2000 |
| JP | 2012-206594 A | 10/2012 |
| JP | 2012-224247 A | 11/2012 |

*Primary Examiner* — Hunter B Lonsberry
*Assistant Examiner* — Hossam M Abd El Latif
(74) *Attorney, Agent, or Firm* — Oliff PLC

(57) ABSTRACT

A vehicle travel control apparatus having a cruise control function allows a driver to perform an acceptance operation for rendering a set speed coincident with a speed limit when the speed limit is different from the set speed. When the drive can perform the acceptance operation, the vehicle travel control apparatus must inform the driver to that effect. In view of this, when the acceptance operation can be performed, an additional display is provided on a display unit to be located between a display representing the set speed and a display representing the speed limit, to thereby inform the driver that the driver can perform an operation relating to the set speed and the speed limit (i.e., can perform the acceptance operation).

20 Claims, 19 Drawing Sheets

(56) References Cited

U.S. PATENT DOCUMENTS

| | | | |
|---|---|---|---|
| 2013/0145297 A1* | 6/2013 | Ricci | B60W 30/182 |
| | | | 715/765 |
| 2017/0334500 A1* | 11/2017 | Jarek | B62K 11/04 |
| 2018/0074497 A1* | 3/2018 | Tsuji | G05D 1/0257 |
| 2018/0273050 A1* | 9/2018 | Tertoolen | B60R 1/00 |
| 2019/0011564 A1* | 1/2019 | Kwon | G01S 17/46 |

\* cited by examiner (A) LONG PRESS OPERATION OF ACCELERATION SWITCH (EXCLUDING THE CASE WHERE VEHICLE IS IN STANDSTILL MAINTAINING STATE)

| | AFTER ELAPSE OF LONG PRESS TIME Tlp | | |
|---|---|---|---|
| AT START OF OPERATION | Vlim: UNRECOGNIZABLE | Vlim ≦ Vset | Vlim > Vset |
| Vlim: UNRECOGNIZABLE | ACCELERATION OPERATION | ACCELERATION OPERATION | ACCELERATION OPERATION |
| Vlim ≦ Vset | ACCELERATION OPERATION | ACCELERATION OPERATION | ACCELERATION OPERATION |
| Vlim > Vset | OPERATION INVALIDATED | OPERATION INVALIDATED | UP ACCEPTANCE OPERATION |

FIG.2A (B) LONG PRESS OPERATION OF DECELERATION SWITCH

| | AFTER ELAPSE OF LONG PRESS TIME Tlp | | |
|---|---|---|---|
| AT START OF OPERATION | Vlim: UNRECOGNIZABLE | Vlim ≧ Vset | Vlim < Vset |
| Vlim: UNRECOGNIZABLE | COAST OPERATION | COAST OPERATION | COAST OPERATION |
| Vlim ≧ Vset | COAST OPERATION | COAST OPERATION | COAST OPERATION |
| Vlim < Vset | OPERATION INVALIDATED | OPERATION INVALIDATED | DOWN ACCEPTANCE OPERATION |

FIG.2B

VEHICLE TRAVEL CONTROL APPARATUS

BACKGROUND OF THE INVENTION

Field of the Invention

The present invention relates to a vehicle travel control apparatus having a cruise control function for causing an own vehicle to travel at a speed set by a driver.

Description of the Related Art

A vehicle (own vehicle) to which a conventionally known vehicle travel control apparatus of such a type is applied (hereinafter also referred to as the "conventional apparatus") allows a driver to increase and decrease the set speed by operating an acceleration switch and a deceleration switch provided in the own vehicle (for example, refer to Japanese Patent Application Laid-open No, 2012-206594).

In addition, the conventional apparatus obtains (recognizes), from an image of a scene ahead of the vehicle captured by an onboard camera, the speed limit of a road on which the own vehicle travels. When the speed limit is newly obtained, the conventional apparatus temporarily operates in a standby mode. During the standby mode, if the speed limit is greater than the set speed, the set speed is rendered coincident with the speed limit in response to operation of the acceleration switch. Meanwhile, during the standby mode, if the speed limit is less than the set speed, the set speed is rendered coincident with the speed limit in response to operation of the deceleration switch. In the following description, the operations of the acceleration switch and the deceleration switch for rendering the set speed coincident with the speed limit will also be referred to as the "acceptance operation".

In addition, during the standby mode, the conventional apparatus blinks the set speed and the speed limit displayed on a display unit for cruise control. The conventional apparatus allows the driver of the own vehicle to render the set speed coincident with the speed limit through simple operation.

However, when the set speed and the speed limit displayed on the display unit blink, the driver of the own vehicle may fail to understand the intention of the blinked display (namely, that the driver can render the set speed coincident with the speed limit through the acceptance operation).

SUMMARY OF THE INVENTION

The present invention has been accomplished so as to solve the above-described problem, and one object of the present invention is to provide a vehicle travel control apparatus which can more certainly inform a driver of a state in which the driver can render a set speed coincident with a speed limit by performing an acceptance operation (specifically, starting and completing the acceptance operation) (hereinafter such a state will also be referred to as the "acceptance operation executable state") when the acceptance operation executable state is established.

A vehicle travel control apparatus according to the present invention (hereinafter also referred to as the "apparatus of the present invention") which achieves the above-described object includes a braking and driving force control section, an operation section, a speed limit acquisition section, an acceptance process execution section, a display section, and a display control section.

The braking and driving force control section (a drive assist ECU 21, an engine ECU 31, and a brake ECU 32) controls "driving force" and "braking force" of an own vehicle (10) such that the travel speed (Vs) of said own vehicle coincides with a set speed (Vset) set by a driver of said own vehicle.

Said operation section (an operation lever 50) allows said driver of said own vehicle to change the state of said operation section between an "OFF state" in which said operation section is not operated and an "ON state" in which said operation section is operated.

Said speed limit acquisition section (an image processing ECU 33 and a camera 67) acquires a "speed limit (Vlim)" of a road on which said own vehicle travels.

Said acceptance process execution section (the drive assist ECU 21) executes an "acceptance process" for rendering said set speed coincident with said speed limit, upon completion of a predetermined "acceptance operation" including an "OFF to ON operation" of changing the state of said operation section from said OFF state to said ON state (step 935 and step 970 of FIG. 9).

Said display section (a display unit 43) can provide a "set speed display (71)" representing said set speed at a "first position" which can be viewed by said driver and can provide a "speed limit display (72)" representing said speed limit at a "second position" which can be viewed by said driver.

Said display control section (the drive assist ECU 21) causes said display section so as to provide said set speed display and said speed limit display (FIG. 3).

Further, said acceptance process execution section (the drive assist ECU 21) executes said acceptance process upon completion of said acceptance operation in the case where a predetermined "specific condition (Condition 3 and Condition 7)" is satisfied at a point in time when said OFF to ON operation is performed (step 930 and step 965 of FIG. 9).

Said display section provides an "additional display (a first arrow portion 83*a* and a second arrow portion 84*a*)" at a "third position" which is located between said first position and said second position and which can be viewed by said driver, said additional display representing that said acceptance operation can be performed.

Said display control section causes said display section to start said additional display when said operation section is in said OFF state and said specific condition is satisfied if the state of said operation section is changed to said ON state (step 1220 and step 1230 of FIG. 12).

The acceptance process is performed upon completion of the acceptance operation, provided that the specific condition is satisfied when the OFF to ON operation is performed. As will be described later, the specific condition may be a condition which defines the magnitude relation between the speed limit and the set speed or a condition employed by the conventional apparatus; i.e., within a predetermined period of time after the speed limit was obtained.

The additional display is provided (displayed) when there is a possibility that when the OFF to ON operation is performed, at least the specific condition is satisfied, whereby the acceptance process is executed. In addition, unlike the conventional apparatus which blinks the set speed display and the speed limit display, the apparatus of the present invention provides an additional display at a position between the set speed display and the speed limit display. Accordingly, the apparatus of the present invention can more certainly inform the driver that the acceptance operation executable state has been established.

In addition, said display control section may provide said additional display by providing a display including an arrow-like figure extending from said second position at which said speed limit display is provided toward said first position at which said set speed display is provided (FIGS. 7 and 8).

The additional display including the arrow-like figure more clearly shows that there is established a state in which the speed limit can be reflected on the set speed (i.e., the acceptance operation executable state). Therefore, according to this mode, it is possible to more clearly inform the driver that the acceptance operation executable state has been established.

In one mode of the apparatus of the present invention, said operation section may include an "acceleration switch (52)" whose state can be changed between a "first OFF state" corresponding to said OFF state and a "first ON state" corresponding to said ON state, and a "deceleration switch (53)" whose state can be changed between a "second OFF state" corresponding to said OFF state and a "second ON state" corresponding to said ON state.

In addition, said acceptance process execution section may execute said acceptance process in the case where an "up acceptance operation" corresponding to said acceptance operation is started at a first point in time when the state of the acceleration switch is changed from said first OFF state to said first ON state and is completed at a second point in time until which said first ON state is continued for a predetermined first long press time (Tlp1) after said first point in time, provided that a "first specific condition (Condition 3) that said speed limit is greater than said set speed and that corresponds to said specific condition" is satisfied at said first point in time and the "condition (Condition 4) that said speed limit is greater than said set speed" is also satisfied at said second point in time (step 930 and step 935 of FIG. 9); and said acceptance process execution section may execute said acceptance process in the case where a "down acceptance operation" corresponding to said acceptance operation is started at a third point in time when the state of the deceleration switch is changed from said second OFF state to said second ON state and is completed at a fourth point in time until which said second ON state is continued for a predetermined second long press time (Tlp2) after said third point in time, provided that a "second specific condition (Condition 7) that said speed limit is less than said set speed and that corresponds to said specific condition" is satisfied at said third point in time and the "condition (Condition 8) that said speed limit is less than said set speed" is also satisfied at said fourth point in time (step 965 and step 970 of FIG. 9).

Further, said display section may be configured such that it can provide a "first additional display (a first arrow portion 83a)" and a second additional display (a second arrow portion 84a)" as said additional display.

Meanwhile, said display control section may cause said display section to start said first additional display when said acceleration switch is in said first OFF state and said first specific condition is satisfied if the state of said acceleration switch is changed to said first ON state (step 1220 of FIG. 12), and cause said display section to start said second additional display when said deceleration switch is in said second OFF state and said second specific condition is satisfied if the state of said deceleration switch is changed to said second ON state (step 1230 of FIG. 12).

For example, the operation section is realized by an operation lever whose base portion is attached to a steering column of the own vehicle and which can be tilted in the vertical direction. In this case, the operation section may be configured such that the acceleration switch enters the first ON state only when the operation lever is pressed and tilted upward and the deceleration switch enters the second ON state only when the operation lever is pressed and tilted downward.

In this case, the first additional display is displayed when the acceptance process is performed in response to the up acceptance operation, and the second additional display is displayed when the acceptance process is performed in response to the down acceptance operation. Therefore, according to the present mode, in the case where the executable acceptance operation changes between the up acceptance operation and the down acceptance operation in accordance with the magnitude relation between the speed limit and the set speed, it is possible to inform the driver of the acceptance operation (the up acceptance operation or the down acceptance operation) which causes the execution of the acceptance process. Namely, according to the present mode, it is possible to inform the driver of the acceptance operation executable state together with the details of the acceptance operation.

In the present mode, said display control section may be configured to end said first additional display when a predetermined "first display time (Td1)" elapses after start of said first additional display, and end said second additional display when a predetermined "second display time (Td2)" longer than said first display time elapses after start of said second additional display.

When the set speed is greater than the speed limit, the actual travel speed of the own vehicle is likely to be greater than the speed limit (namely, over speeding is likely to occur). In this case, it is desired to execute the down acceptance process so as to quickly end the state in which the set speed is greater than the speed limit. Therefore, it can be said that the second additional display which is displayed when the down acceptance operation can be performed is more important for the driver than the first additional display which is displayed when the up acceptance operation can be performed. According to this mode, since the second additional display is displayed for a period of time longer than the period of time during which the first additional display is displayed, it is possible to more certainly inform the driver that the second additional display is provided when the down acceptance operation can be performed.

Notably, the display of the first additional display may be ended when the acceptance operation executable state ends even when the first display time has not yet elapsed since the start of the first additional display. In addition, the display of the second additional display may be ended when the acceptance operation executable state ends even when the second display time has not yet elapsed since the start of the second additional display.

In addition, said display section may be configured to provide said first additional display and said second additional display by using colors different from each other (FIG. 7 and FIG. 8).

For example, the first additional display may be blue-colored, and the second additional display may be red-colored. According to this mode, the driver can clearly distinguish the first additional display and the second additional display from each other, whereby the driver can easily know which one of the up acceptance operation and the down acceptance operation can be performed.

Meanwhile, said display section may be configured to employ, as said first position, a position on an analog speed meter (44) provided in said own vehicle and having scale lines indicating vehicle speed, the "position specifying one of the scale lines which corresponds to said set speed", and perform said set speed display by displaying at said first position a "first mark (set speed display 76)" which specifies the scale line corresponding to said set speed; and said display section may be configured to employ, as said second position, a position on the speed meter having the scale lines indicating vehicle speed, the "position specifying one of the scale lines which corresponds to said speed limit," and perform said speed limit display by displaying at said second position a "second mark (speed limit display 77)" which specifies the scale line corresponding to said speed limit (FIGS. 17 and 18).

In the present embodiment, the set speed display and the speed limit display are displayed on the dial of the speed meter or near the dial. Therefore, according to the present mode, the drive can view the set speed display, the speed limit display and the additional display without greatly moving his/her eyes from the speed meter. In other words, according to the present mode, it is possible to more certainly inform the driver that the acceptance operation executable state has been established.

In the above description, in order to facilitate understanding of the present invention, the constituent elements of the invention corresponding to those of embodiments of the invention which will be described later are accompanied by parenthesized names and/or symbols which are used in the embodiments; however, the constituent elements of the invention are not limited to those in the embodiments defined by the names and/or the symbols. Other objects, other features, and attendant advantages of the present invention will be readily appreciated from the following description of the embodiments of the invention which is made with reference to the accompanying drawings.

BRIEF DESCRIPTION OF THE DRAWINGS

FIG. 2A is a table showing processes which are executed upon long press operation of an acceleration switch of the first apparatus;

FIG. 2B is a table showing processes which are executed upon long press operation of a deceleration switch of the first apparatus;

DESCRIPTION OF THE PREFERRED EMBODIMENTS

Vehicle travel control apparatuses according to embodiments of the present invention will be described in detail with reference to the drawings.

First Embodiment

Figure 1:
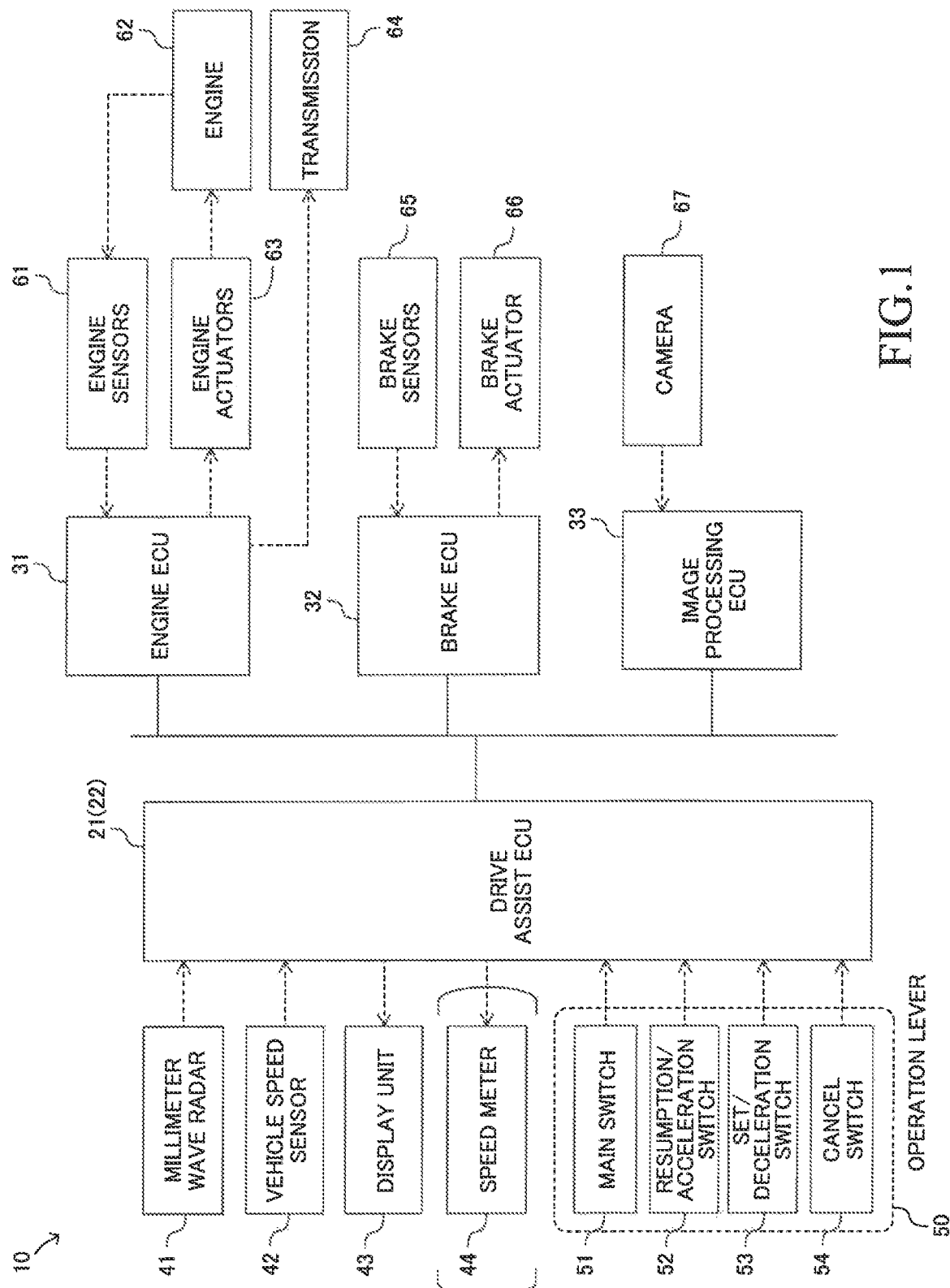
FIG. 1 is a schematic diagram of a vehicle (present vehicle) to which a vehicle travel control apparatus (first apparatus) according to a first embodiment of the present invention is applied.

A vehicle travel control apparatus according to a first embodiment of the present invention (hereinafter also referred to as the "first apparatus") is mounted on a vehicle (own vehicle) 10 shown in FIG. 1. The own vehicle 10 includes "a drive assist ECU 21, an engine ECU 31, a brake ECU 32, and an image processing ECU 33" each of which is an electronic control unit (ECU).

The drive assist ECU 21 includes a CPU, a ROM, and a RAM. The CPU performs data reading, numerical computation, computation result output, etc. by repeatedly executing predetermined programs (routines). The ROM stores the programs executed by the CPU, lookup tables (maps), etc. The RAM stores data temporarily.

Like the drive assist ECU 21, each of the engine ECU 31, the brake ECU 32, and the image processing ECU 33 includes a CPU, a ROM, and a RAM. These ECUs can perform data communication (can exchange data) with one another through a CAN (controller area network).

The drive assist ECU 21 is connected to a millimeter wave radar 41, a vehicle speed sensor 42, a display unit 43, and an operation lever 50.

The millimeter wave radar 41 transmits a millimeter wave (electromagnetic wave whose frequency falls within the range of 30 GHz to 300 GHz) toward a region ahead of the own vehicle 10, and receives its reflected wave. On the basis of the transmitted wave and the reflected wave, the millimeter wave radar 41 obtains, as target information, the position (relative position) of a target present ahead of the own vehicle 10 in relation to the own vehicle 10 and the speed (relative speed) of the target in relation to the own vehicle 10, and outputs the obtained target information to the drive assist ECU 21.

The vehicle speed sensor 42 detects the vehicle speed Vs of the own vehicle 10 and outputs a signal representing the vehicle speed Vs.

The display unit 43 is a liquid crystal display (LCD) disposed on a center console (not shown) within the vehicle compartment of the own vehicle 10. Namely, the display unit 43 is provided at a position determined such that a driver can view the items displayed on the display unit 43. The display unit 43 displays characters, symbols, etc. in accordance with an instruction from the drive assist ECU 21 to thereby provide information to the driver of the own vehicle 10. The display unit 43 includes an unillustrated speaker. The display unit 43 can perform reproduction of a warning sound, an announcement, etc. in accordance with an instruction from the drive assist ECU 21.

The operation lever 50 includes a main switch 51, a resumption/acceleration switch 52, a set/deceleration switch 53, and a cancel switch 54. A base portion of the operation lever 50 is attached to a steering column (not shown) of the own vehicle 10, and a distal end portion of the operation lever 50 extends radially outward of a steering wheel (not shown). The operation lever 50 is attached in such a manner that the driver can tilt the operation lever 50 in the upward direction, the downward direction, and the direction toward the near side (the rear side of the own vehicle 10) as viewed from the driver of the own vehicle 10.

The main switch 51 is disposed at the distal end portion of the operation lever 50. Every time the main switch 51 is pushed, the main switch 51 alternately enters its ON state and its OFF state. Notably, in the present specification, a description "a switch enters the ON state" has the same meaning as a description "the switch outputs a signal (ON signal or high-level signal) representing the ON state." Similarly, in the present specification, a description "a switch enters the OFF state" has the same meaning as a description "the switch outputs a signal (OFF signal or low-level signal) representing the OFF state."

The resumption/acceleration switch 52 enters its ON state when the driver pushes the operation lever 50 in the upward direction. When the driver releases the hand from the operation lever 50 after that, the resumption/acceleration switch 52 enters its OFF state. The resumption/acceleration switch 52 will also be referred to as the "acceleration switch 52" for simplification.

The set/deceleration switch 53 enters its ON state when the driver pushes the operation lever 50 in the downward direction. When the driver releases the hand from the operation lever 50 after that, the set/deceleration switch 53 enters its OFF state. The set/deceleration switch 53 will be also referred to as the "deceleration switch 53" for simplification.

The cancel switch 54 enters its ON state when the driver pulls the operation lever 50 toward the near side. When the driver releases the hand from the operation lever 50 after that, the cancel switch 54 enters its OFF state.

The engine ECU 31 is connected to a plurality of engine sensors 61 and receives detection signals from these sensors. The engine sensors 61 detect the operation state quantities of the engine 62 which is a drive source of the own vehicle 10. The engine sensors 61 include an accelerator pedal operation amount sensor, a throttle valve opening sensor, an engine rotational speed sensor, an intake air amount sensor, etc.

Further, the engine ECU 31 is connected to engine actuators 63, such as a throttle valve actuator and a fuel injection valve, and a transmission 64. The engine ECU 31 changes the torque Tq generated by the engine 62 of the own vehicle 10 and the gear ratio of the transmission 64 by controlling the engine actuators 63 and the transmission 64. Thus, the engine ECU 31 adjusts the driving force of the own vehicle 10 to thereby control acceleration As (the amount of change in the vehicle speed Vs per unit time).

The brake ECU 32 is connected to a plurality of brake sensors 65 and receives detection signals from these sensors. The brake sensors 65 detect parameters used for controlling an unillustrated "brake (hydraulic frictional brake) mounted on the own vehicle 10." The brake sensors 65 includes an operation amount sensor for detecting the operation amount of a brake pedal (not shown), wheel speed sensors for detecting the rotational speeds of the wheels, etc.

Further, the brake ECU 32 is connected to a brake actuator 66. The brake actuator 66 is a hydraulic control actuator. The brake actuator 66 is provided in a hydraulic circuit extending between a master cylinder which pressurizes hydraulic oil by using the depressing force applied to the brake pedal and the friction brake including well-known wheel cylinders provided in the wheels. The hydraulic circuit, the master cylinder, and the friction brake are not shown in the drawings. The brake actuator 66 controls the oil pressure supplied to the wheel cylinders. The brake ECU 32 generates brake forces (frictional brake forces) Bf applied to the wheels, by driving the brake actuator 66, so as to control the acceleration As (in this case, negative acceleration; namely, deceleration) of the own vehicle 10.

The image processing ECU 33 is connected to a camera 67 fixed to a central portion of the front end of the body of the own vehicle 10. The camera 67 captures the image of a region located ahead of the own vehicle 10. The image processing ECU 33 receives a signal representing the image captured by the camera 67. The image processing ECU 33 extracts a traffic sign or a road marking (hereinafter also referred to as a "speed limit sign" collectively) which is contained, as an object, in the image represented by the signal received from the camera 67, and recognizes (acquires) a speed limit Vlim represented by the speed limit sign. The image processing ECU 33 outputs a signal representing the acquired speed limit Vlim to the drive assist ECU 21. In the case where the image processing ECU 33 fails to recognize the speed limit Vlim (that is, in the case where the speed limit Vlim is unrecognizable), the image processing ECU 33 outputs a "signal showing that the speed limit Vlim is unrecognizable" to the drive assist ECU 21.

Notably, the case where the image processing ECU 33 cannot recognize the speed limit Vlim occurs when at least one of the following conditions is satisfied, for example. On the basis of the image represented by the signal received from the camera 67, the image processing ECU 33 recognizes the type of a road on which the own vehicle 10 is travelling and whether the own vehicle 10 makes a left turn or a right turn at an intersection,

- Although the image processing ECU 33 has recognized an object that seems as a sign representing a speed limit, the degree of reliability of a speed limit Vlim acquired (recognized) therefrom is equal to or lower than a threshold because, for example, the image of the object is unclear.
- A speed limit Vlim has not yet been recognized on the basis of a speed limit sign after an ignition key switch (not shown) of the own vehicle 10 was changed from the OFF state to the ON state.
- A new speed limit Vlim has not yet been recognized despite that the own vehicle 10 has traveled over a predetermined distance after the previous speed limit Vlim was recognized on the basis of a speed limit sign.

A new speed limit Vlim has not yet been recognized on the basis of a speed limit sign after the own vehicle 10 entered a road (for example, an expressway) which differs in type from the road (for example, an ordinary road) on which the vehicle travelled at the point in time when the previous speed limit Vlim was recognized on the basis of a previous speed limit sign.

The own vehicle 10 travelling on an ordinary road makes a right turn or a left turn at an intersection.

(Outline of ACC Control)

Next, operation of the first apparatus configured as described above will be described. During execution of ACC (adaptive cruise control), the first apparatus provides displays regarding a set speed Vset, a speed limit Vlim, an acceptance operation, etc. which will be described later. First, the ACC will be described.

When the main switch 51 is switched from the OFF state to the ON state, the drive assist ECU 21 starts the ACC which will be described later. When the deceleration switch 53 first enters the ON state after the start of the ACC and then enters the OFF state, the drive assist ECU 21 renders the set speed Vset coincident with the vehicle speed Vs "at the time when the deceleration switch 53 entered the OFF state."

During execution of the ACC, the drive assist ECU 21 determines, on the basis of the object information acquired from the millimeter wave radar 41, whether or not a vehicle which is travelling (immediately) ahead of the own vehicle 10 and which the own vehicle 10 must follow (namely, a to-be-followed vehicle) is present in accordance with a well-known method. Namely, the drive assist ECU 21 determines, as a to-be-followed vehicle, an object which is one of the objects detected by the millimeter wave radar 41 and which is located within a predetermined range located ahead of the own vehicle 10. In the case where the drive assist ECU 21 determines that no to-be-followed vehicle is present, the drive assist ECU 21 determines a target acceleration Atgt of the own vehicle 10 such that the vehicle speed Vs becomes equal to the set speed Vset. Meanwhile, in the case where the drive assist ECU 21 determines that a to-be-followed vehicle is present, the drive assist ECU 21 determines the target acceleration Atgt in accordance with a well-known method such that the distance between the own vehicle 10 and the to-be-followed vehicle (namely, inter-vehicle distance) becomes equal to a predetermined target inter-vehicle distance Dtgt. The control for the case where the target acceleration Atgt is determined such that the inter-vehicle distance between the own vehicle 10 and the to-be-followed vehicle becomes equal to the target inter-vehicle distance Dtgt will also be referred to as "follow-up travel control."

The drive assist ECU 21 transmits request signals to the engine ECU 31 and the brake ECU 32 such that the actual acceleration As becomes equal to the target acceleration Atgt. In general, when the target acceleration Atgt assumes a positive value, the drive assist ECU 21 transmits to the engine ECU 31 a request signal for requesting the engine ECU 31 to increase the torque Tq of the engine. When the target acceleration Atgt assumes a negative value, the drive assist ECU 21 transmits to the engine ECU 31 a request signal for requesting the engine ECU 31 to decrease the torque Tq. In the case where the target acceleration Atgt assumes a negative value and its absolute value is relatively large, the drive assist ECU 21 transmits to the engine ECU 31 a request signal for requesting the engine ECU 31 to decrease the torque Tq to "0" and transmits to the brake ECU 32 a request signal for requesting the brake ECU 32 to generate a brake force Bf. As a result, the travel of the own vehicle 10 is controlled such that the actual acceleration As of the own vehicle 10 coincides with the target acceleration Atgt.

The drive assist ECU 21 ends the ACC when the main switch 51 is switched from the ON state to the OFF state by the driver of the own vehicle 10. In addition, the drive assist ECU 21 halts the ACC (namely, temporarily cancels the ACC) when the cancel switch 54 is brought into the ON state, or when the brake pedal of the own vehicle 10 is operated by the driver. When the acceleration switch 52 is switched from the OFF state to the ON state in a state in which the main switch 51 has been maintained in the ON state and the ACC has been halted, the drive assist ECU 21 resumes the ACC by using the set speed Vset at the time when the ACC was stopped (halted).

When the to-be-followed vehicle stops during execution of the follow-up travel control, the own vehicle 10 also stops. When the to-be-followed vehicle resumes the travel after that, the drive assist ECU 21 maintains the own vehicle 10 in the stopped state. The state in which the to-be-followed vehicle has resumed the travel and the own vehicle 10 maintains the stopped state will also be referred to as the "standstill maintaining state". When the acceleration switch 52 is switched from the OFF state to the ON state in a state in which the own vehicle 10 is in the standstill maintaining state and the acceleration switch 52 is maintained in the ON state for a predetermined long press time Tlp1 or longer, the drive assist ECU 21 causes the own vehicle 10 to start. At that time, if the to-be-followed vehicle is present (namely, if the to-be-followed vehicle having resumed the travel is present within the predetermined range ahead of the own vehicle 10), the drive assist ECU 21 resumes the follow-up travel control. Meanwhile, if the to-be-followed vehicle is absent, the target acceleration Atgt of the own vehicle 10 is determined such that the vehicle speed Vs coincides with the set speed Vset.

(Operation of Changing the Set Speed)

Incidentally, during execution of the ACC, the drive assist ECU 21 changes the set speed Vset as described below in accordance with the operation of the operation lever 50 by the driver as shown in the tables of FIGS. 2A and 2B.

Notably, an operation of maintaining the acceleration switch 52 in the ON state for the long press time Tlp1 or longer and an operation of maintaining the deceleration switch 53 in the ON state for a predetermined long press time Tlp2 or longer will also be referred to as a "long press operation." Notably, in the present embodiment, the long press time Tlp1 and the long press time Tlp2 are the same; i.e., are set to a time Tlp; however, the long press time Tlp1 and the long press time Tlp2 may differ from each other. Meanwhile, "an operation of returning the acceleration switch 52, having been switched from the OFF state to the ON state, to the OFF state before the long press time Tlp1 (=Tlp) elapses" and "an operation of returning the deceleration switch 53, having been switched from the OFF state to the ON state, to the OFF state before the long press time Tlp2 (=Tlp) elapses" will also be referred to as a "short press operation." In the present embodiment, the long press time Tlp is 0.6 sec.

A1: Changing (Increasing) of the Set Speed Through Tap Up Operation

When the acceleration switch 52 is switched from the OFF state to the ON state and is then switched to the OFF state before the predetermined long press time Tlp elapses (namely, the short press operation is performed for the acceleration switch 52), the drive assist ECU 21 increases the set speed Vset by a predetermined first speed change amount Vc1. The operation and process of increasing the set speed Vset by the first speed change amount Vc1 in response to the short press operation of the acceleration switch 52 will be referred to as a "tap up operation" and a "tap up process," respectively. In the present embodiment, the first speed change amount Vc1 is 1 km/h.

A2: Changing (Increasing) of the Set Speed Through Acceleration Operation

When the acceleration switch 52 is switched from the OFF state to the ON state and is maintained in the ON state for the long press time Tlp or longer (namely, the long press operation is performed for the acceleration switch 52), the drive assist ECU 21 increases the set speed Vset by a predetermined constant speed change amount (namely, a second speed change amount Vc2) when the long press time Tlp elapses and every time a predetermined interval time Tin elapses since the elapse of the long press time Tlp. In this case, the drive assist ECU 21 increases the set speed Vset stepwise until the acceleration switch 52 is brought into the OFF state. The operation and process of increasing the set speed Vset stepwise (by the second speed change amount Vc2 in each step) in response to the long press operation of the acceleration switch 52 will be referred to as an "acceleration operation" and an "acceleration process," respectively. In the present embodiment, the interval time Tin is 0.6 sec, and the second speed change amount Vc2 is 5 km/h.

However, as shown in FIG. 2A, the acceleration process is executed only when one of the following Condition 1 and Condition 2 is satisfied.

Condition 1: The speed limit Vlim was unrecognizable at the time when the acceleration switch 52 was switched from the OFF state to the ON state (namely, the time when the long press operation of the acceleration switch 52 was started).

Condition 2: The acquired (recognized) speed limit Vlim was equal to or less than the set speed Vset (namely, Vlim≤Vset) at the time when the acceleration switch 52 was switched from the OFF state to the ON state (namely, the time when the long press operation of the acceleration switch 52 was started).

A3: Changing (Increasing) of the Set Speed Based on the Speed Limit

Meanwhile, in the case where the acceleration switch 52 was switched from the OFF state to the ON state and was maintained in the ON state for the long press time Tlp or longer (namely, the long press operation is performed for the acceleration switch 52), the drive assist ECU 21 sets the set speed Vset to the speed limit Vlim when both of Condition 3 and Condition 4 which will be described below are satisfied. This operation and process will be referred to as an "up acceptance operation" and an "up acceptance process," respectively.

Condition 3: At the time when the acceleration switch 52 was switched from the OFF state to the ON state (namely, the time when the long press operation of the acceleration switch 52 was started), the own vehicle 10 was not in the standstill maintaining state, the speed limit Vlim had been already acquired (recognized) (the speed limit Vlim was not unrecognizable), and the acquired (recognized) speed limit Vlim was greater than the set speed Vset (namely, Vlim>Vset). This Condition 3 is a condition which is satisfied when none of Condition 1 and Condition 2 are satisfied when the acceleration switch 52 is switched from the OFF state to the ON state.

Condition 4: The acquired (recognized) speed limit Vlim is greater than the set speed Vset (namely, Vlim>Vset) at the time when the long press time Tlp has elapsed since the acceleration switch 52 was switched from the OFF state to the ON state.

Notably, Condition 3 will also be referred to as the "first specific condition" for convenience. The time when the acceleration switch 52 was switched from the OFF state to the ON state (the time when the long press operation of the acceleration switch 52 was started) will be referred to as the "first point in time" for convenience. The time when the long press time Tlp has elapsed since the acceleration switch 52 was switched from the OFF state to the ON state will be referred to as the "second point in time" for convenience.

Incidentally, in the case where Condition 3 is satisfied (in other words, the acceleration process is not performed because none of Condition 1 and Condition 2 are satisfied) and Condition 4 is not satisfied, the drive assist ECU 21 does not execute the up acceptance process. Namely, in this case, the long press operation for the acceleration switch 52 is treated as an invalid operation, and the set speed Vset is not changed.

Specifically, in the case where the speed limit Vlim newly acquired (recognized) before the long press time Tlp elapses since the acceleration switch 52 was switched from the OFF state to the ON state is equal to or less than the set speed Vset, there arises a phenomenon in which the set speed Vset decreases as a result of the long press operation of the acceleration switch 52. In order to avoid such a phenomenon, even when Condition 3 is satisfied, such long press operation for the acceleration switch 52 is treated as an invalid operation. Further, in the case where the speed limit Vlim becomes unrecognizable between the point in time when the acceleration switch 52 was switched from the OFF state to the ON state and the point in time when the long press time Tlp elapses since that point, the long press operation for the acceleration switch 52 is treated as an invalid operation.

B1: Changing (Decreasing) of the Set Speed Through Tap Down Operation

When the deceleration switch 53 is switched from the OFF state to the ON state and then is switched to the OFF state before the predetermined long press time Tlp elapses (namely, the short press operation is performed for the deceleration switch 53), the drive assist ECU 21 decreases the set speed Vset by the first speed change amount Vc1. The operation and process of decreasing the set speed Vset by the first speed change amount Vc1 in response to the short press operation of the deceleration switch 53 will be referred to as a "tap down operation" and a "tap down process," respectively.

B2: Changing (Decreasing) of the Set Speed Through Coast Operation

When the deceleration switch 53 is switched from the OFF state to the ON state and is maintained in the ON state for the long press time Tlp or longer (namely, the long press operation is performed for the deceleration switch 53), the drive assist ECU 21 decreases the set speed Vset by the predetermined constant speed change amount (namely, the second speed change amount Vc2) when the long press time Tlp elapses and every time the interval time Tin elapses after the elapse of the long press time Tlp. In this case, the drive assist ECU 21 decreases the set speed Vset stepwise until the deceleration switch 53 is brought into the OFF state. The operation and process of decreasing the set speed Vset stepwise (by the second speed change amount Vc2 in each step) in response to the long press operation of the deceleration switch 53 will be referred to as a "coast operation" and a "coast process," respectively.

However, as shown in FIG. 2B, the coast process is executed only when one of the following Condition 5 and Condition 6 is satisfied.

Condition 5: The speed limit Vlim was unrecognizable at the time when the deceleration switch 53 was switched from the OFF state to the ON state (namely, the time when the long press operation of the deceleration switch 53 was started).

Condition 6: The acquired (recognized) speed limit Vlim was equal to or greater than the set speed Vset (namely, Vlim Vset) at the time when the deceleration switch 53 was switched from the OFF state to the ON state (namely, the time when the long press operation of the deceleration switch 53 was started).

B3: Changing (Decreasing) of the Set Speed Based on the Speed Limit

Meanwhile, in the case where the deceleration switch 53 is switched from the OFF state to the ON state and is maintained in the ON state for the long press time Tlp or longer (namely, the long press operation is performed for the deceleration switch 53), the drive assist ECU 21 sets the set speed Vset to the speed limit Vlim when both of Condition 7 and Condition 8 which will be described below are satisfied. This operation and process will be referred to as a "down acceptance operation" and a "down acceptance process," respectively. In the following description, the "up acceptance process" and the "down acceptance process" will also be referred to as the "acceptance process" collectively.

Condition 7: At the time when the deceleration switch 53 was switched from the OFF state to the ON state (namely, the time when the long press operation of the deceleration switch 53 was started), the speed limit Vlim had been already acquired (recognized) (the speed limit Vlim was not unrecognizable), and the acquired (recognized) speed limit Vlim was less than the set speed Vset (namely, Vlim<Vset). This Condition 7 is a condition which is satisfied when none of Condition 5 and Condition 6 are satisfied when the deceleration switch 53 is switched from the OFF state to the ON state.

Condition 8: The acquired (recognized) speed limit Vlim is less than the set speed Vset (namely, Vlim<Vset) at time when the long press time Tlp has elapsed since the deceleration switch 53 was switched from the OFF state to the ON state.

Notably, Condition 7 will also be referred to as the "second specific condition" for convenience. The time when the deceleration switch 53 was switched from the OFF state to the ON state (the time when the long press operation of the deceleration switch 53 was started) will be referred to as the "third point in time" for convenience. The time when the long press time Tlp elapses since the deceleration switch 53 was switched from the OFF state to the ON state will be referred to as the "fourth point in time" for convenience.

Incidentally, in the case where Condition 7 is satisfied (in other words, the coast process is not performed because none of Condition 5 and Condition 6 are satisfied) and Condition 8 is not satisfied, the drive assist ECU 21 does not execute the down acceptance process. Namely, in this case, the long press operation for the deceleration switch 53 is treated as an invalid operation, and the set speed Vset is not changed.

Specifically, in the case where the speed limit Vlim newly acquired (recognized) before the long press time Tlp elapses since the deceleration switch 53 was switched from the OFF state to the ON state is equal to or greater than the set speed Vset, there arises a phenomenon in which the set speed Vset increases as a result of the long press operation of the deceleration switch 53. In order to avoid such a phenomenon, even when Condition 7 is satisfied, the long press operation for the deceleration switch 53 is treated as an invalid operation. Further, in the case where the speed limit Vlim becomes unrecognizable between the point in time when the deceleration switch 53 was switched from the OFF state to the ON state and the point in time when the long press time Tlp elapses since after that point, the long press operation for the deceleration switch 53 is treated as an invalid operation.

Incidentally, as described above, when the long press operation of the acceleration switch 52 is performed in a state in which the own vehicle 10 is in the standstill maintaining state, the drive assist ECU 21 resumes the travel of the own vehicle 10. Specifically, in this case, the ACC is resumed through use of the set speed Vset at the time when the own vehicle 10 has entered the standstill maintaining state. The operation and process of resuming the travel of the own vehicle 10 in response to the long press operation of the acceleration switch 52 will be referred to as a "starting operation" and a "starting process," respectively.

(Display)

Figure 3:
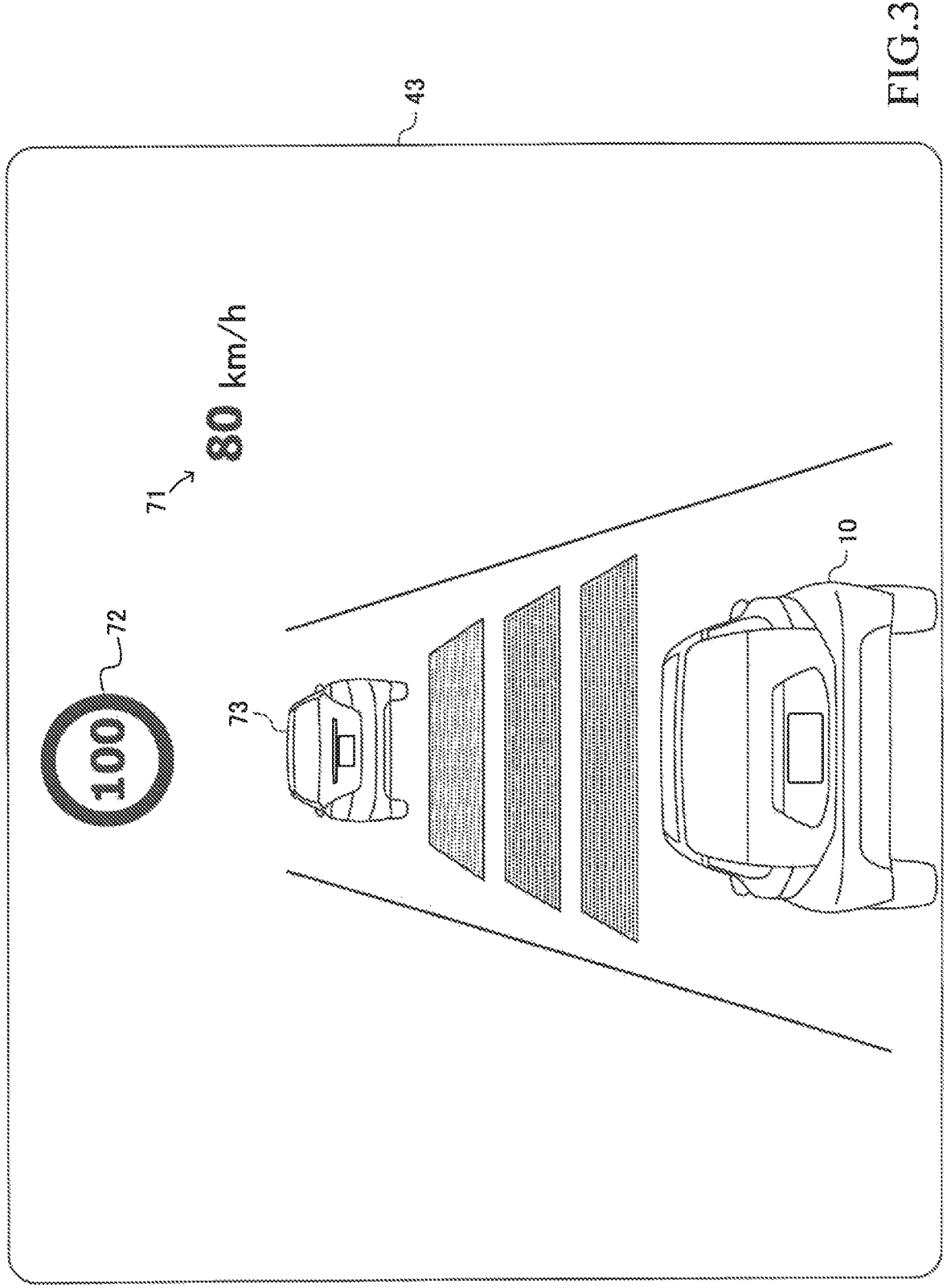
FIG. 3 is an illustration showing examples of a set speed display and a speed limit display which are displayed on the display unit (first display unit) provided in the first apparatus.

Next, the items which are displayed on the display unit 43 by the first apparatus during execution of the ACC will be described. As shown in FIG. 3, the drive assist ECU 21 displays on the display unit 43 a figure representing the own vehicle 10, a figure representing a to-be-followed vehicle 73 (if the to-be-followed vehicle is present), the set speed Vset, and the speed limit Vlim, In FIG. 3, a set speed display 71 represents the set speed Vset, and a speed limit display 72 represents the speed limit Vlim. The figure representing the own vehicle 10 is displayed in a lower portion of a central region of the display unit 43, and the figure representing a to-be-followed vehicle 73 is displayed in an upper portion of the central region of the display unit 43. The set speed Vset is displayed at a first position in an upper right region of the display unit 43. The speed limit Vlim is displayed at a second position in an upper portion of the central region of the display unit 43. In the example shown in FIG. 3, the set speed Vset is 80 km/h, and the speed limit Vlim is 100 km/h. In the case where the speed limit Vlim is unrecognizable, the speed limit display 72 is not displayed. In the case where the to-be-followed vehicle is not present, the to-be-followed vehicle 73 is not displayed.

Figure 4:
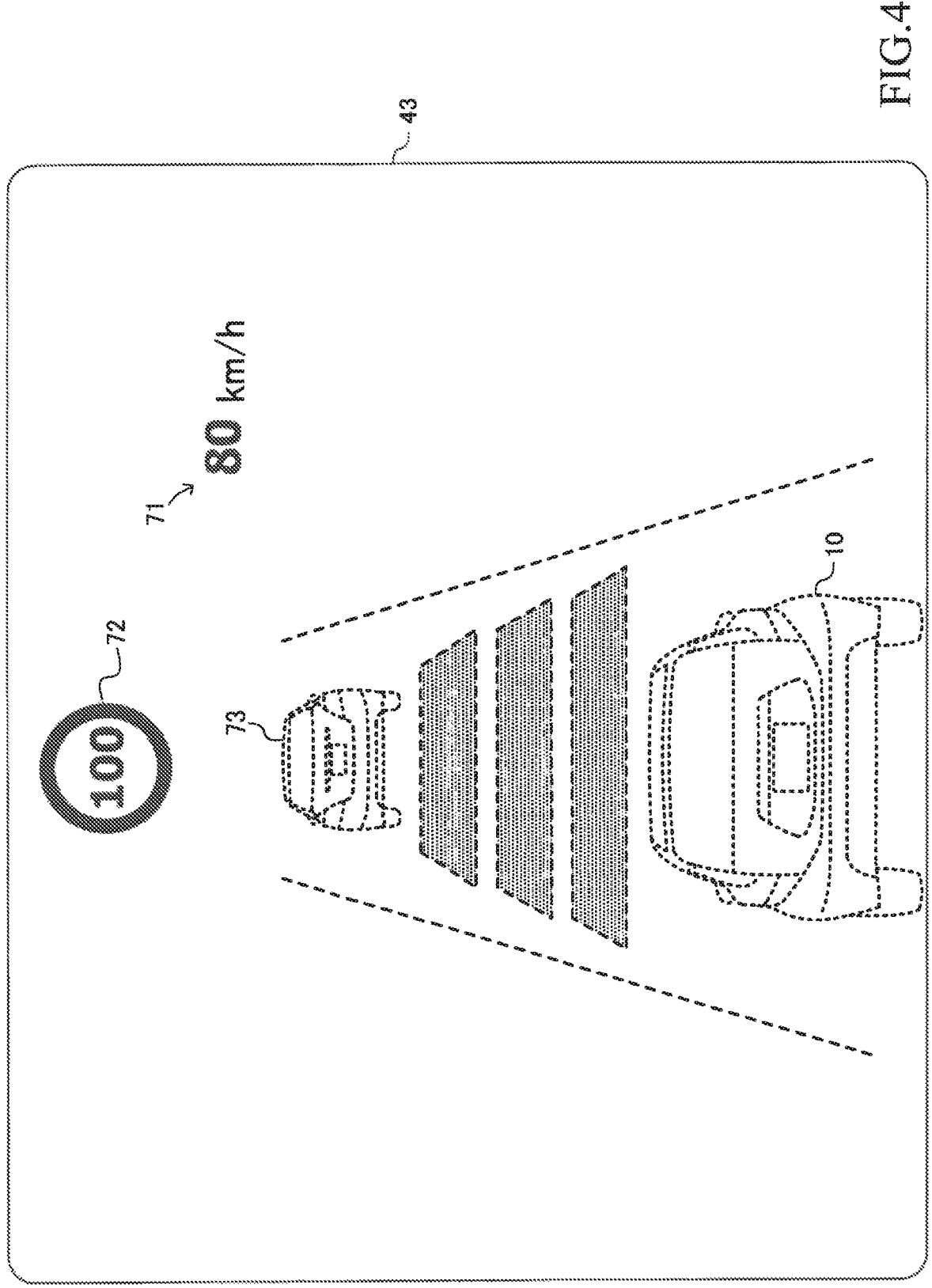
FIG. 4 is an illustration showing an approach warning displayed on the first display unit.

When the distance between the own vehicle 10 and a vehicle travelling immediately ahead of the own vehicle 10 becomes smaller than a predetermined first distance threshold Dth1, the drive assist ECU 21 starts an approach warning. The approach warning is provided by blinking the items displayed on the display unit 43 shown in FIG. 4 (broken lines in FIG. 4 represent that the state in which the items are displayed and the state in which the items are not displayed alternatingly occur at predetermined time intervals), and by reproducing a warning sound by a speaker provided in the display unit 43. When the distance between the own vehicle 10 and the vehicle travelling immediately ahead of the own vehicle 10 becomes greater than "a predetermined second distance threshold Dth2 greater than the first distance threshold Dth1," the drive assist ECU 21 ends the approach warning. For example when another vehicle (third vehicle) breaks into the space between the to-be-followed vehicle and the own vehicle 10 from "a lane different from the lane along which the own vehicle 10 is travelling," the approach warning is started if the distance between the own vehicle 10 and the third vehicle is less than the first distance threshold Dth1.

Figure 5:
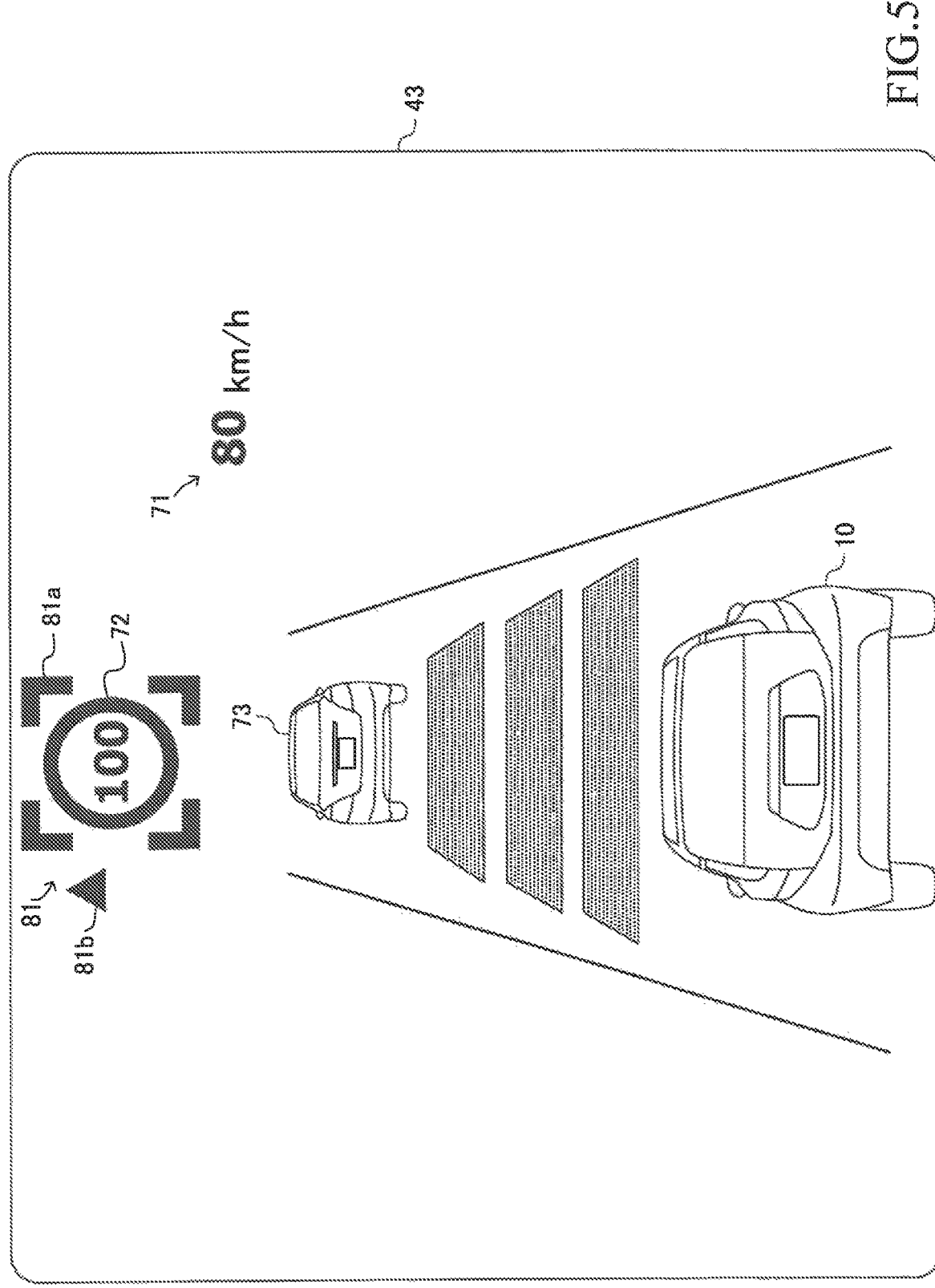
FIG. 5 is an illustration showing an up acceptance display displayed on the first display unit.
Figure 6:
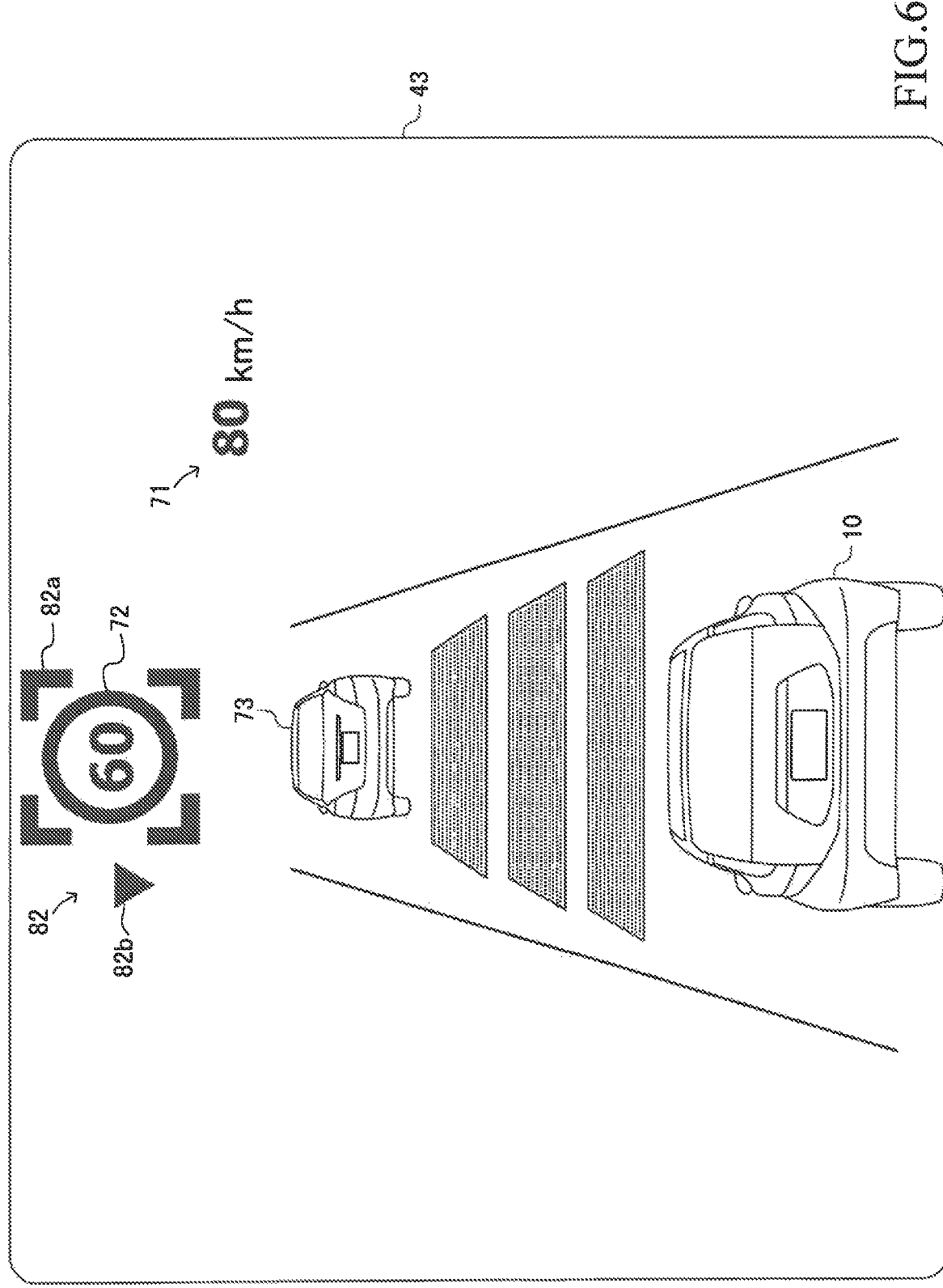
FIG. 6 is an illustration showing a down acceptance display displayed on the first display unit.

In addition, in the case where the up acceptance process can be executed if an operation for the long press operation of the acceleration switch 52 is started at the present (namely, an acceptance operation executable state has been established), as shown in FIG. 5, the drive assist ECU 21 displays an up acceptance display figure 81 on the display unit 43. Meanwhile, in the case where the down acceptance process is executed if the long press operation of the deceleration switch 53 is performed (namely, the acceptance operation executable state has been established), as shown in FIG. 6, the drive assist ECU 21 displays a down acceptance display figure 82 on the display unit 43.

More specifically, the current situation is assumed to be a situation in which the ACC is currently executed and the operation for the long press operation of the acceleration switch 52 is started at the present point in time because the speed limit Vlim is greater than the set speed Vset at the present point in time. In this case, Condition 3 is satisfied and Condition 4 is highly likely to be satisfied after elapse of the long press time Tlp from the present point in time, whereby the up acceptance process is executed. In such a situation, the drive assist ECU 21 displays an up acceptance display figure 81 on the display unit 43. The up acceptance display figure 81 includes a frame 81a surrounding the speed limit display 72 and an upward triangular mark 81b located on the left side of the frame 81a.

Meanwhile, the current situation is assumed to be a situation in which the ACC is currently executed and the operation for the long press operation of the deceleration switch 53 is started at the present point in time because the speed limit Vlim is less than the set speed Vset at the present point in time. In this case, Condition 7 is satisfied and Condition 8 is highly likely to be satisfied after elapse of the long press time Tlp from the present point in time, whereby the down acceptance process is executed. In such a situation, the drive assist ECU 21 displays a down acceptance display figure 82 on the display unit 43. The down acceptance display figure 82 includes a frame 82a surrounding the speed limit display 72 and a downward triangular mark 82b located on the left side of the frame 82a. The "up acceptance display figure 81" and the "down acceptance display figure 82" will also be referred to as the "acceptance display figure" collectively.

Figure 7:
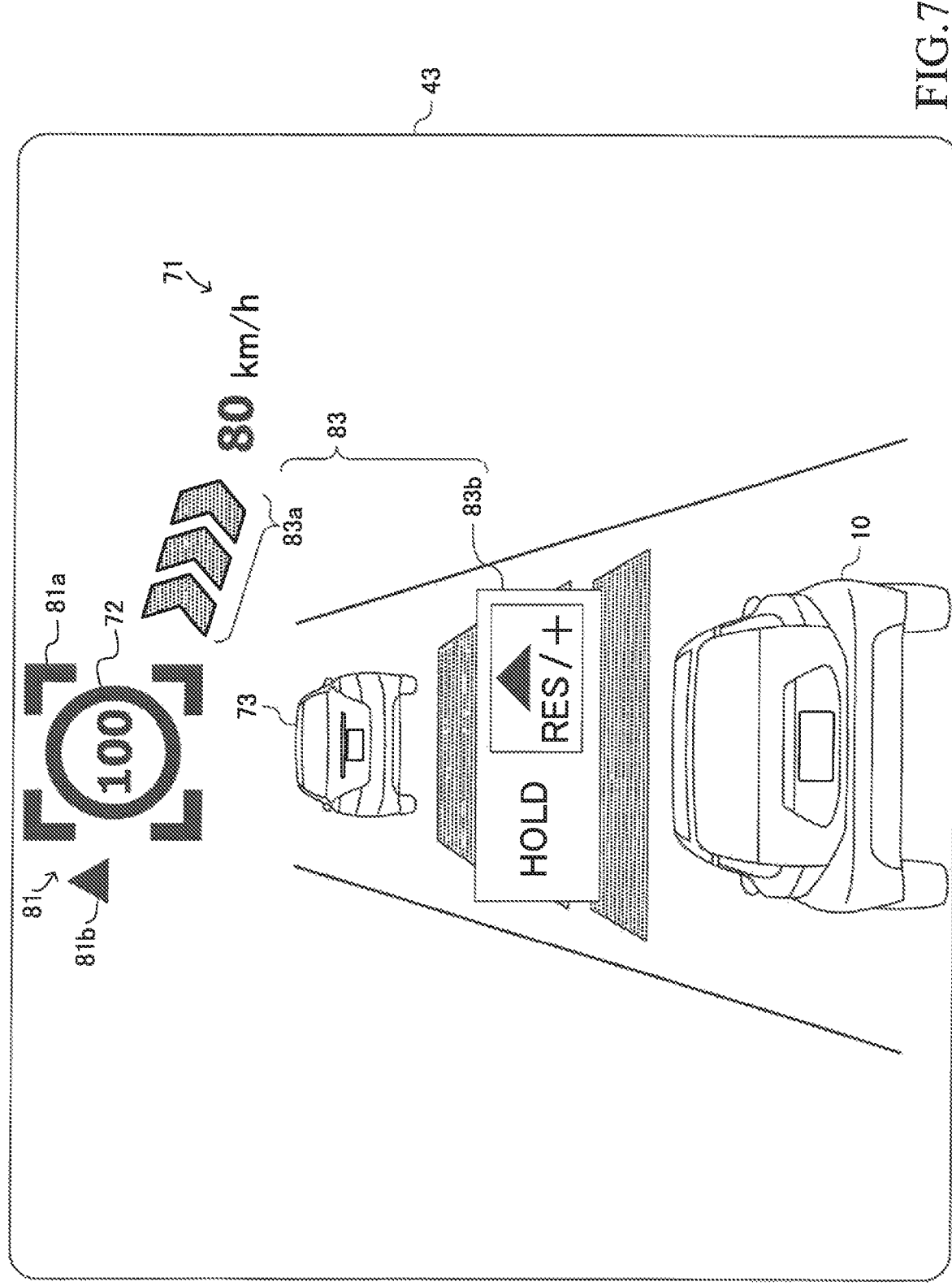
FIG. 7 is an illustration showing an up pop-up display displayed on the first display unit.

Further, when the drive assist ECU 21 starts the display of the up acceptance display figure 81, as shown in FIG. 7, the drive assist ECU 21 temporarily adds (displays) a pop-up display figure (specifically, an up pop-up display figure 83) on the display unit 43. The up pop-up display figure 83 includes a "first arrow portion 83a extending from the speed limit display 72 toward the set speed display 71" and a "first rectangular portion 83b meaning the long press operation of the acceleration switch 52." The first arrow portion 83a is displayed between a first position at which the set speed Vset is displayed and a second position at which the speed limit Vlim is displayed. The first rectangular portion 83b is displayed between the own vehicle 10 and the to-be-followed vehicle 73. The drive assist ECU 21 ends the display of the up pop-up display figure 83 when a predetermined first display time Td1 elapses since the display of the up pop-up display figure 83 was started (since the display of the up acceptance display figure 81 was started).

Figure 8:
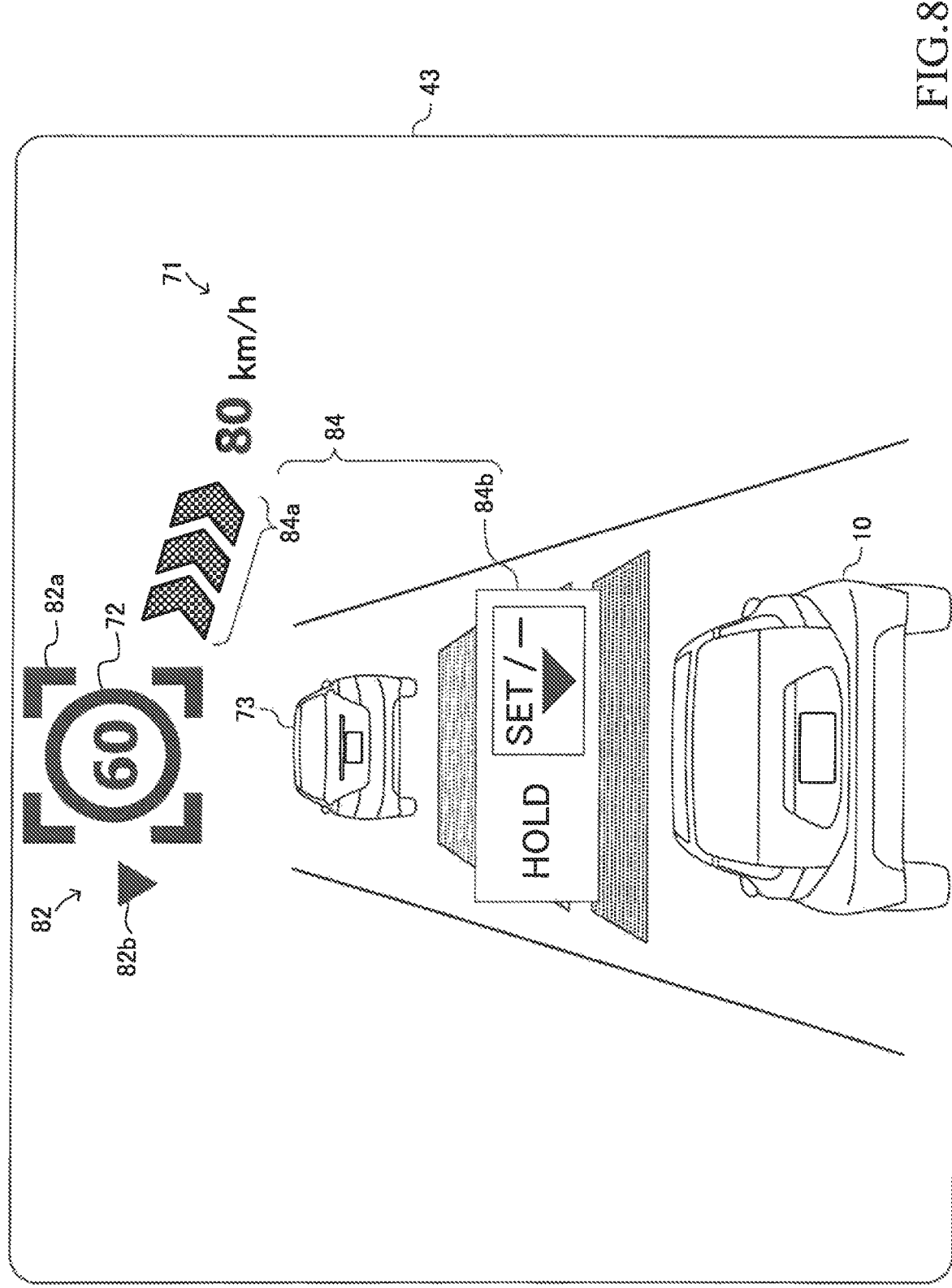
FIG. 8 is an illustration showing a down pop-up display displayed on the first display unit.

Meanwhile, when the drive assist ECU 21 starts the display of the down acceptance display figure 82, as shown in FIG. 8, the drive assist ECU 21 temporarily adds (displays) a pop-up display figure (specifically, a down pop-up display figure 84) on the display unit 43. The down pop-up display figure 84 includes a "second arrow portion 84a extending from the speed limit display 72 toward the set speed display 71" and a "second rectangular portion 84b meaning the long press operation of the deceleration switch 53." The second arrow portion 84a is displayed between the first position at which the set speed Vset is displayed and the second position at which the speed limit Vlim is displayed. The second rectangular portion 84b is displayed between the own vehicle 10 and the to-be-followed vehicle 73. The drive assist ECU 21 ends the display of the down pop-up display figure 84 when a predetermined second display time Td2 elapses since the display of the down pop-up display figure 84 was started (since the display of the down acceptance display figure 82 was started).

The up pop-up display figure 83 and the down pop-up display figure 84 will also be referred to as the "pop-up display figure" collectively. In the present embodiment, the first arrow portion 83a of the up pop-up display figure 83 is blue-colored, and the second arrow portion 84a of the down pop-up display figure 84 is red-colored. In the present embodiment, the first display time Td1 is 5 sec and the second display time Td2 is 10 sec (i.e., Td1<Td2). The first arrow portion 83a will also be referred to as the "first additional display" for convenience, and the second arrow portion 84a will also be referred to as the "second additional display" for convenience. The position at which the first arrow portion 83a is displayed and the position at which the second arrow portion 84a is displayed will also be referred to as the "third position" for convenience.

Incidentally, the driver of the own vehicle 10 may feel that the display of the pop-up display figure is annoying, in view of this, the driver can switch the mode of display between a mode in which the pop-up display figure is displayed and a mode in which the pop-up display figure is not displayed by operating a mode changeover switch (not shown) provided on the steering wheel of the own vehicle 10. The operation of switching the display mode to the mode in which the pop-up display figure is not displayed through operation of the mode changeover switch will also be referred to as "invalidation of pop-up display," When the invalidation of pop-up display is set, even when the up acceptance display figure 81 is displayed, the up pop-up display figure 83 is not displayed, and even when the down acceptance display figure 82 is displayed, the down pop-up display figure 84 is not displayed.

In addition, when the approach warning has been started, the drive assist ECU 21 does not display the pop-up display figure on the display unit 43 because the drive assist ECU 21 gives priority to the provision of approach-warning-related information to the driver over the provision of information regarding the acceptance process. Namely, during execution of the approach warning, the drive assist ECU 21 does not display the pop-up display figure even when the pop-up display figure must be displayed.

(Specific Operation—Set Speed Change Process)

Next, the specific operation of the drive assist ECU 21 will be described. First, the operation of the drive assist ECU 21 for the up acceptance process, the down acceptance process, the acceleration process, and the coast process will be described, and then the operation of the drive assist ECU 21 for the display of the up acceptance display figure 81, the down acceptance display figure 82, the up pop-up display figure 83, and the down pop-up display figure 84 will be described.

Figure 9:
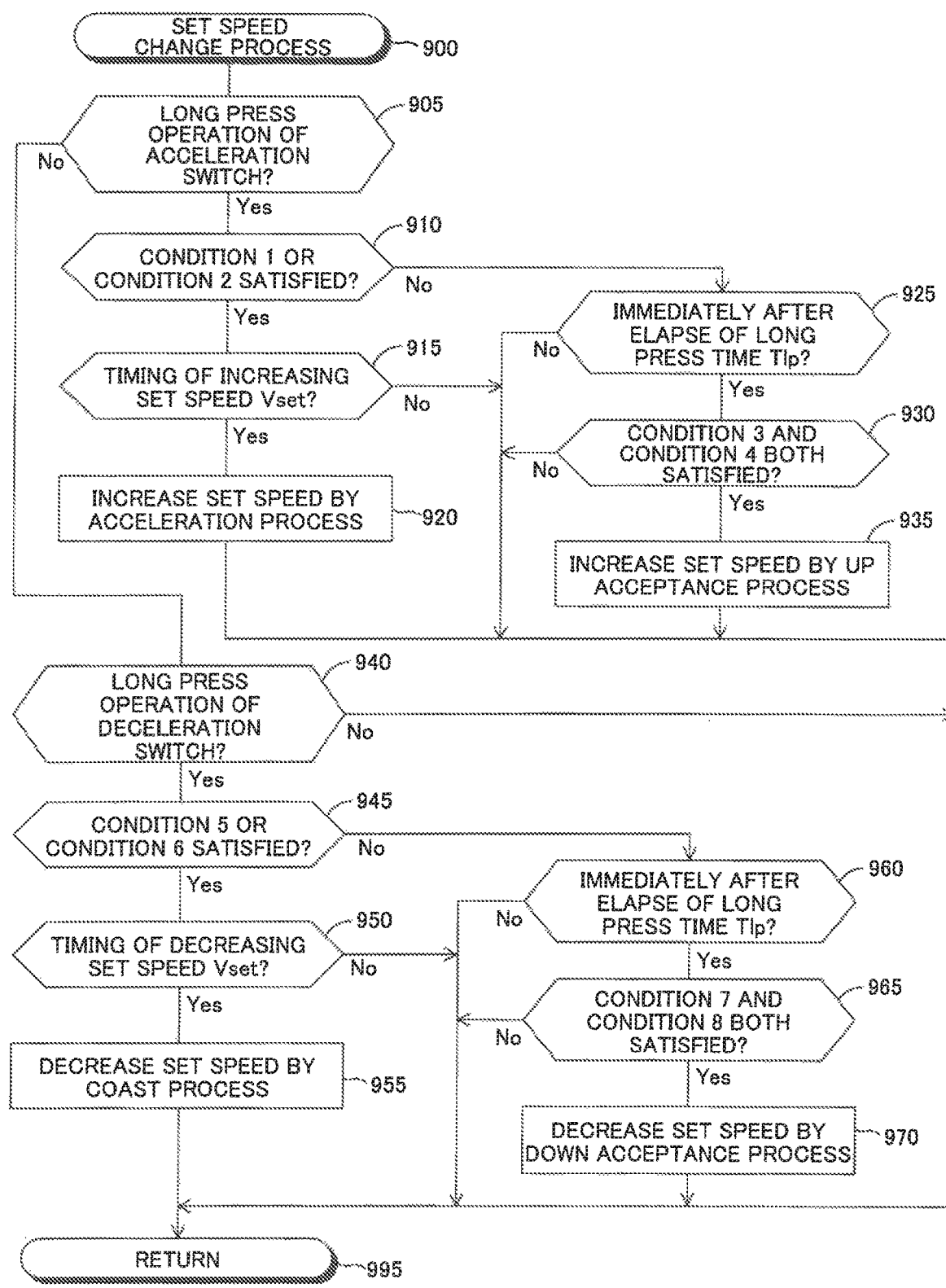
FIG. 9 is a flowchart representing a set speed change process routine executed by the first apparatus.

During execution of the ACC, the CPU of the drive assist ECU 21 (hereinafter also referred to as "CPU" for simplification) executes a "set speed change process routine" represent by a flowchart in FIG. 9 every time a predetermined period of time elapses. Accordingly, when a proper timing has come, the CPU starts the process from step 900 of FIG. 9 and proceeds to step 905 so as to determine whether or not the long press operation of the acceleration switch 52 is performed. Namely, the CPU determines whether or not the ON state of the acceleration switch 52 has continued for the long press time Tlp or longer.

In the case where the long press operation of the acceleration switch 52 is performed, the CPU makes a "Yes" determination in step 905 and proceeds to step 910 so as to determine whether or not one of the above-described Condition 1 and Condition 2 is satisfied. In the case where one of Condition 1 and Condition 2 is satisfied, the CPU makes a "Yes" determination in step 910 and proceeds to step 915 so as to determine whether or not the present point in time is one of the timings of increasing the set speed Vset by the acceleration process.

Specifically, the timings at which the set speed Vset is increased by the second speed change amount Vc2 by the acceleration process are following two timings (a1) and (b1).
(a1) The timing at which the present routine is first executed after the long press time Tlp has elapsed after the acceleration switch 52 was switched from the OFF state to the ON state.
(b1) The timing at which the present routine is first executed after the interval time Tin has elapsed after the set speed Vset was increased by the second speed change amount Vc2 as a result of the last execution of the acceleration process.

In the case where the present point in time is the timing of increasing the set speed Vset by the acceleration process, the CPU makes a "Yes" determination in step 915 and proceeds to step 920 so as to increase the set speed Vset by the second speed change amount Vc2. Next, the CPU proceeds to step 995 so as to end the present routine. In the case where the present point in time is not the timing of increasing the set speed Vset by the acceleration process, the CPU makes a "No" determination in step 915 and proceeds directly to step 995.

Meanwhile, in the case where none of Condition 1 and Condition 2 are satisfied, the CPU makes a "No" determination in step 910 and proceeds to step 925 so as to determine whether or not the present point in time is immediately after the long press time Tlp has elapsed since the acceleration switch 52 was switched from the OFF state to the ON state (whether or not the present routine is first executed after elapse of the long press time Tlp).

In the case where the determination condition in step 925 is satisfied, the CPU makes a "Yes" determination in step 925 and proceeds to step 930 so as to determine whether or not both the above-described Condition 3 and Condition 4 are satisfied.

In the case where both Condition 3 and Condition 4 are satisfied, the CPU makes a "Yes" determination in step 930 and proceeds to step 935 so as to execute the up acceptance process. Namely, the CPU sets the set speed Vset to the speed limit Vlim. Subsequently, the CPU proceeds to step 995.

Incidentally, theoretically, even in the case where both Condition 3 and Condition 4 are satisfied, the speed limit Vlim may temporarily become unrecognizable or become equal to or less than the set speed Vset before elapse of the long press time Tlp from the point when the acceleration switch 52 was switched from the OFF state to the ON state. However, in actuality, the possibility that the speed limit Vlim changes two or more times during elapse of the long press time Tlp (in the present embodiment, 0.6 sec) is low. Accordingly, in the case where both Condition 3 and Condition 4 are satisfied, the drive assist ECU 21 determines that the ON state of the acceleration switch 52 has continued for the long press time Tlp during the period during which the speed limit Vlim is greater than the set speed Vset.

Notably, in the case where the determination condition in step 925 is not satisfied, the CPU makes a "No" determination in step 925 and proceeds directly to step 995. In addition, in the case where the determination condition in step 930 is not satisfied, the CPU makes a "No" determination in step 930 and proceeds directly to step 995.

Meanwhile, in the case where the long press operation of the acceleration switch 52 is not performed, the CPU makes a "No" determination in step 905 and proceeds to step 940 so as to determine whether or not the long press operation of the deceleration switch 53 is performed. Namely, the CPU determines whether or not the ON state of the deceleration switch 53 has continued for the long press time Tlp or longer.

In the case where the long press operation of the deceleration switch 53 is performed, the CPU makes a "Yes" determination in step 940 and proceeds to step 945 so as to determine whether or not one of the above-described Condition 5 and Condition 6 is satisfied. In the case where one of Condition 5 and Condition 6 is satisfied, the CPU makes a "Yes" determination in step 945 and proceeds to step 950 so as to determine whether or not the present point in time is one of the timings of decreasing the set speed Vset by the coast process.

Specifically, the timings at which the set speed Vset is decreased by the second speed change amount Vc2 by the coast process are following two timings (a2) and (b2).
(a2) The timing at which the present routine is first executed after the long press time Tlp has elapsed since the deceleration switch 53 was switched from the OFF state to the ON state.
(b2) The timing at which the present routine is first executed after the interval time Tin has elapsed since the set speed Vset was decreased by the second speed change amount Vc2 as a result of the last execution of the coast process.

In the case where the present point in time is the timing of decreasing the set speed Vset by the coast process, the CPU makes a "Yes" determination in step 950 and proceeds to step 955 so as to decrease the set speed Vset by the second speed change amount Vc2. Next, the CPU proceeds to step 995. In the case where the present point in time is not the timing of decreasing the set speed Vset by the coast process, the CPU makes a "No" determination in step 950 and proceeds directly to step 995.

Meanwhile, in the case where none of Condition 5 and Condition 6 are satisfied, the CPU makes a "No" determination in step 945 and proceeds to step 960 so as to determine whether or not the present point in time is immediately after the long press time Tlp has elapsed since the deceleration switch 53 was switched from the OFF state to the ON state (whether or not the present routine is first executed after elapse of the long press time Tlp).

In the case where the determination condition in step 960 is satisfied, the CPU makes a "Yes" determination in step 960 and proceeds to step 965 so as to determine whether or not both the above-described Condition 7 and Condition 8 are satisfied.

In the case where both Condition 7 and Condition 8 are satisfied, the CPU makes a "Yes" determination in step 965 and proceeds to step 970 so as to execute the down acceptance process. Namely, the CPU sets the set speed Vset to the speed limit Vlim. Subsequently, the CPU proceeds to step 995.

Incidentally, as in the case where both Condition 3 and Condition 4 are satisfied, if both Condition 7 and Condition 8 are satisfied, the drive assist ECU 21 determines that the ON state of the deceleration switch 53 has continued for the long press time Tlp during the period during which the speed limit Vlim is less than the set speed Vset.

Notably, in the case where the determination condition in step 940 is not satisfied, the CPU makes a "No" determination in step 940 and proceeds directly to step 995. In addition, in the case where the determination condition in step 960 is not satisfied, the CPU makes a "No" determination in step 960 and proceeds directly to step 995. Further, in the case where the determination condition in step 965 is not satisfied, the CPU makes a "No" determination in step 965 and proceeds directly to step 995.

(Specific Operation—Acceptance Display Start Process)

Next, the process for displaying the up acceptance display figure 81 and the down acceptance display figure 82 will be described, and then the process for displaying the up pop-up display figure 83 and the down pop-up display figure 84 will be described.

Figure 10:
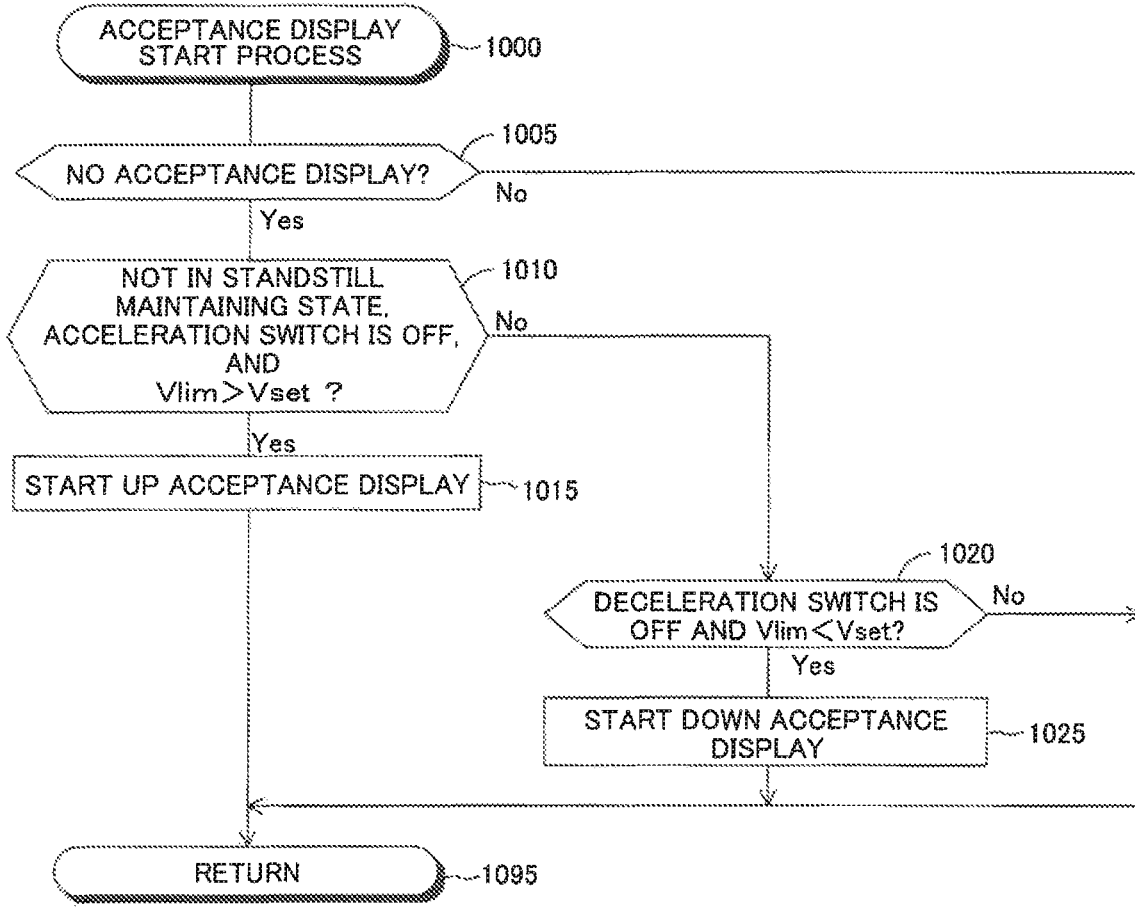
FIG. 10 is a flowchart representing an acceptance display start process routine executed by the first apparatus.

During execution of the ACC, the CPU executes an "acceptance display start process routine" represented by a flowchart in FIG. 10 every time a predetermined period of time elapses. Accordingly, when a proper timing has come, the CPU starts the process from step 1000 of FIG. 10 and proceeds to step 1005 so as to determine whether or not none of the up acceptance display figure 81 and the down acceptance display figure 82 are displayed on the display unit 43 (namely, whether or not no acceptance display figure is displayed).

In the case where either one of the up acceptance display figure 81 and the down acceptance display figure 82 is displayed (namely, the acceptance display figure is displayed), the CPU makes a "No" determination in step 1005 and proceeds directly to step 1095 so as to end the present routine.

In the case where none of the up acceptance display figure 81 and the down acceptance display figure 82 are displayed (namely, the acceptance display figure is not displayed), the CPU makes a "Yes" determination in step 1005 and proceeds to step 1010 so as to determine whether or not an up acceptance display start condition is satisfied. The up acceptance display start condition is satisfied when all the following conditions are satisfied (see Condition 3).

The own vehicle 10 is not in the standstill maintaining state.
The acceleration switch 52 is in the OFF state.
The speed limit Vlim has been recognized, and the speed limit Vlim is greater than the set speed Vset.

In the case where the up acceptance display start condition is satisfied, the CPU makes a "Yes" determination in step 1010 and proceeds to step 1015 so as to start the display of the up acceptance display figure 81. Subsequently, the CPU proceeds step 1095.

Meanwhile, in the case where the up acceptance display start condition is not satisfied, the CPU makes a "No" determination in step 1010 and proceeds to step 1020 so as to determine whether or not the down acceptance display start condition is satisfied. The down acceptance display start condition is satisfied when all the following conditions are satisfied (see Condition 7).

The deceleration switch 53 is in the OFF state.
The speed limit Vlim has been recognized, and the speed limit Vlim is less than the set speed Vset.

In the case where the down acceptance display start condition is satisfied, the CPU makes a "Yes" determination in step 1020 and proceeds to step 1025 so as to start the display of the down acceptance display figure 82. Subsequently, the CPU proceeds step 1095.

Meanwhile, in the case where the down acceptance display start condition is not satisfied, the CPU makes a "No" determination in step 1020 and proceeds directly to step 1095.

(Specific Operation—Acceptance Display End Process)

Next, the process for ending the display of the up acceptance display figure 81 and the down acceptance display figure 82 will be described. During execution of the ACC, the CPU executes an "acceptance display end process routine" represented by a flowchart in FIG. 11 every time a predetermined period of time elapses. Accordingly, when a proper timing has come, the CPU starts the process from step 1100 of FIG. 11 and proceeds to step 1105 so as to determine whether or not the up acceptance display figure 81 is currently displayed.

In the case where the up acceptance display figure 81 is currently displayed, the CPU makes a "Yes" determination in step 1105 and proceeds to step 1110 so as to determine whether or not the following two conditions are satisfied:
the speed limit Vlim is not unrecognizable; and
the speed limit Vlim is greater than the set speed Vset.

In the case where the speed limit Vlim is not unrecognizable, and is greater than the set speed Vset, the CPU makes a "Yes" determination in step 1110 and proceeds directly to step 1195 so as to end the present routine. Namely, in this case, the display of the up acceptance display figure 81 is continued.

Meanwhile, in the case where the speed limit Vlim is equal to or less than the set speed Vset or the speed limit Vlim is unrecognizable, the CPU makes a "No" determination in step 1110 and proceeds to step 1115 so as to end the display of the up acceptance display figure 81. Subsequently, the CPU proceeds to step 1195.

In contrast, in the case where the up acceptance display figure 81 is not displayed at the point when the CPU performs the process of step 1105, the CPU makes a "No" determination in step 1105 and proceeds to step 1120 so as to determines whether or not the down acceptance display figure 82 is currently displayed. In the case where the down acceptance display figure 82 is currently displayed, the CPU makes a "Yes" determination in step 1120 and proceeds directly to step 1125 so as to determine whether or not the following two conditions are satisfied:
the speed limit Vlim is not unrecognizable; and
the speed limit Vlim is less than the set speed Vset.

In the case where the speed limit Vlim is not unrecognizable, and is less than the set speed Vset, the CPU makes a "Yes" determination in step 1125 and proceeds to step 1195. Namely, in this case, the display of the down acceptance display figure 82 is continued.

Meanwhile, in the case where the speed limit Vlim is equal to or greater than the set speed Vset or the speed limit Vlim is unrecognizable, the CPU makes a "No" determination in step 1125 and proceeds directly to step 1130 so as to end the display of the down acceptance display figure 82. Subsequently, the CPU proceeds to step 1195.

Further, in the case where the down acceptance display figure 82 is not displayed at the point when the CPU performs the process of step 1120, the CPU makes a "No" determination in step 1120 and proceeds directly to step 1195.

(Specific Operation—Pop-Up Display Start Process)

Figure 12:
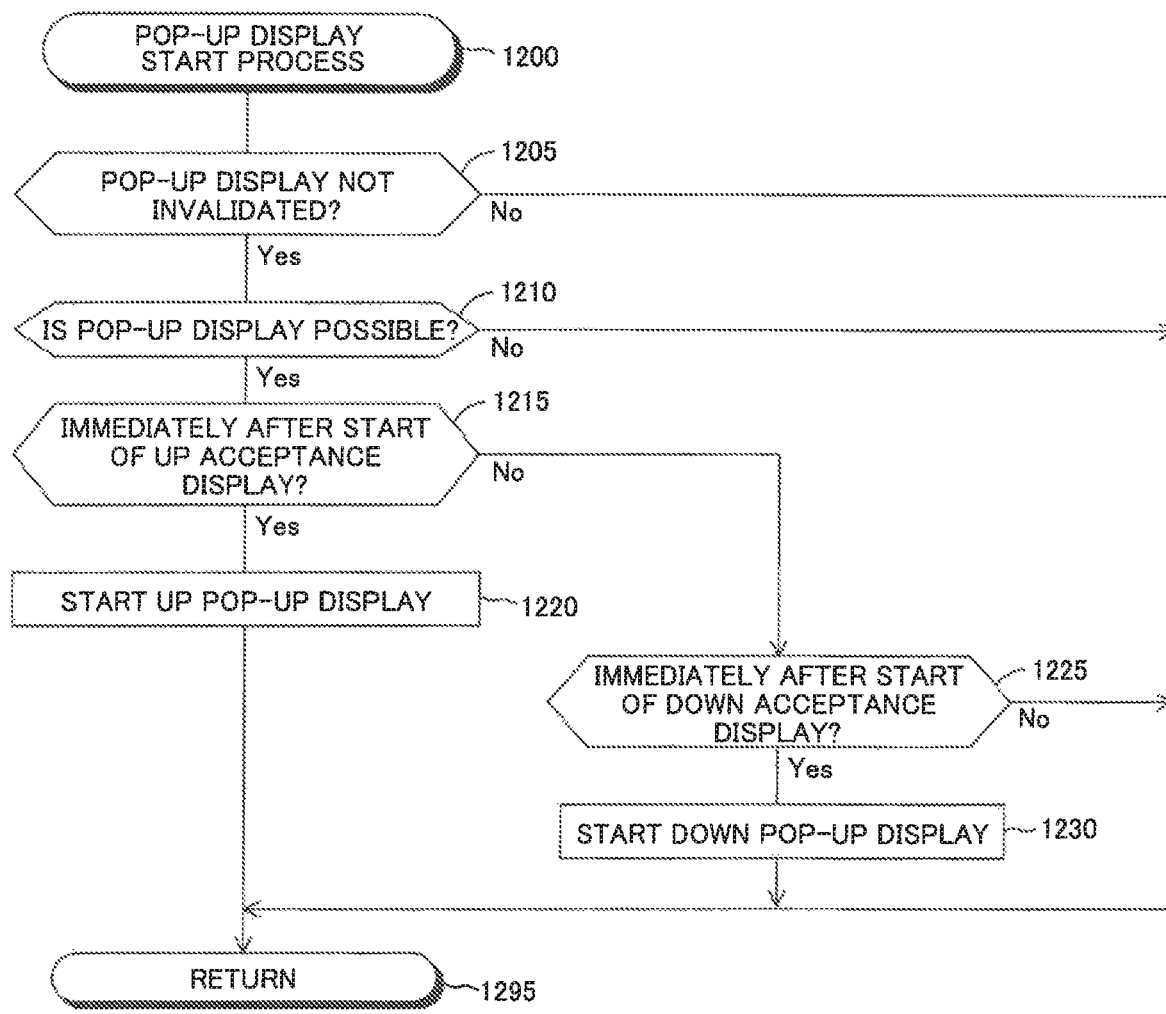
FIG. 12 is a flowchart representing a pop-up display start process routine executed by the first apparatus.

Next, the process for displaying the up pop-up display figure 83 and the down pop-up display figure 84 will be described. During execution of the ACC, the CPU executes a "pop-up display start process routine" represented by a flowchart in FIG. 12 every time a predetermined period of time elapses. Accordingly, when a proper timing has come, the CPU starts the process from step 1200 of FIG. 12 and proceeds to step 1205 so as to determine whether or not the pop-up display has been invalidated by the operation of the above-described mode changeover switch.

In the case where the pop-up display has been invalidated, the CPU makes a "No" determination in step 1205 and proceeds to step 1295 so as to end the present routine. Meanwhile, the pop-up display has not been invalidated, the CPU makes a "Yes" determination in step 1205 and proceeds to step 1210 so as to whether or not the pop-up display figure (namely, either one of the up pop-up display figure 83 and the down pop-up display figure 84) can be displayed on the display unit 43.

Specifically, as described above, in the case where the approach waring is currently performed, the CPU cannot display the pop-up display figure. Accordingly, in such a case, the CPU makes a "No" determination in step 1210 and proceeds directly to step 1295. Meanwhile, in the case where the approach waring is not currently performed, the CPU makes a "Yes" determination in step 1210 and proceeds to step 1215 so as to determine whether or not the present routine is executed for the first time after the display of the up acceptance display figure 81 was started.

In the case where the present routine is executed for the first time after the display of the up acceptance display figure 81 was started, the CPU makes a "Yes" determination in step 1215 and proceeds to step 1220 so as to start the display of the up pop-up display figure 83. Subsequently, the CPU proceeds to step 1295.

Meanwhile, in the case where the execution of the present routine is not the first execution after the display of the up acceptance display figure 81 has started, the CPU makes a "No" determination in step 1215 and proceeds to step 1225 so as to determine whether or not the present routine is performed for the first time after the display of the down acceptance display figure 82 has been started.

In the case where the present routine is executed for the first time after the display of the down acceptance display figure 82 was started, the CPU makes a "Yes" determination in step 1225 and proceeds to step 1230 so as to start the display of the down pop-up display figure 84. Subsequently, the CPU proceeds to step 1295. Meanwhile, in the case where the execution of the present routine is not the first execution after the display of the down acceptance display figure 82 was started, the CPU makes a "No" determination in step 1225 and proceed to step 1295.

(Specific Operation—Pop-Up Display End Process)

Figure 13:
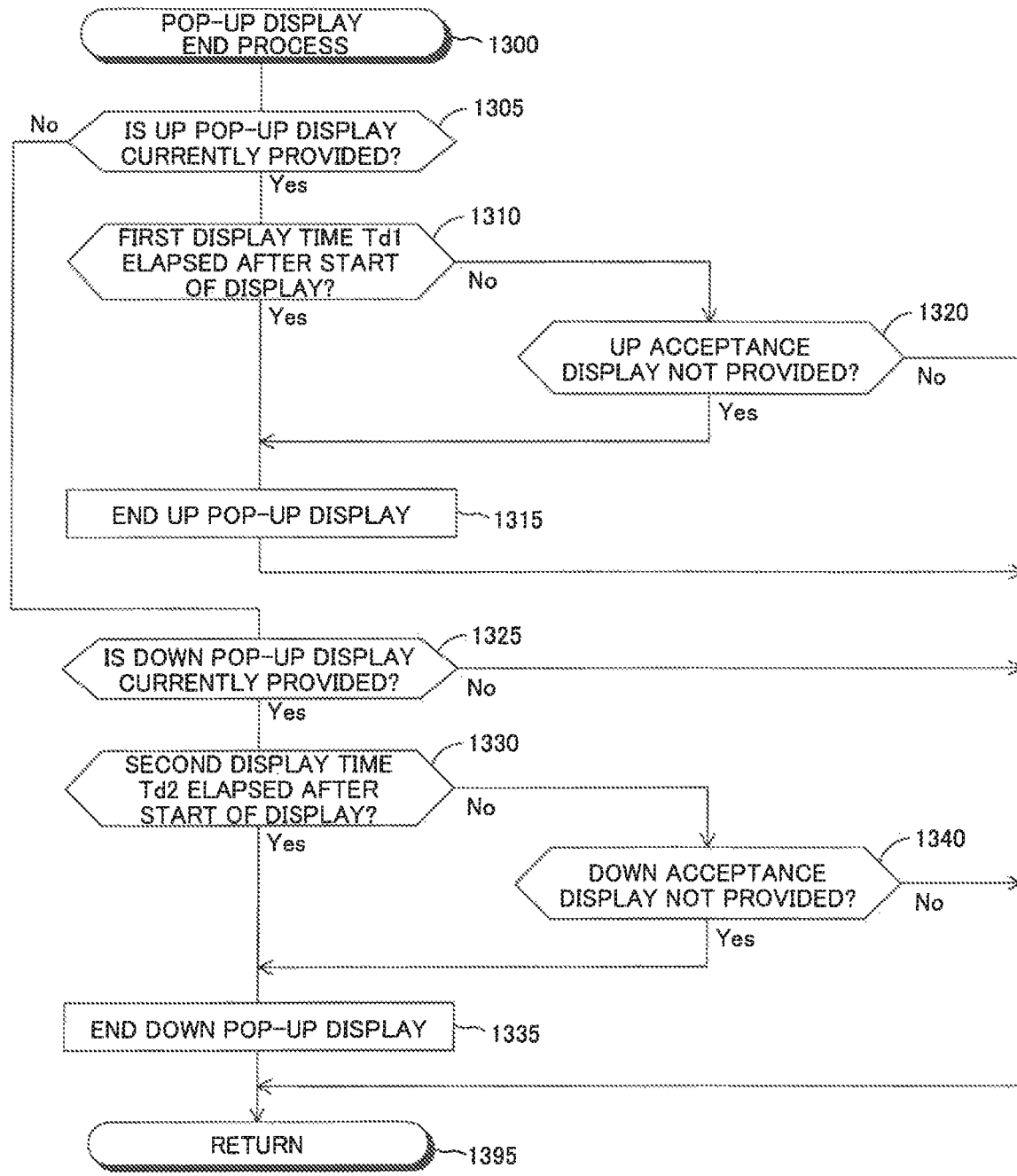
FIG. 13 is a flowchart representing a pop-up display end process routine executed by the first apparatus.

Next, the process for ending the display of the up pop-up display figure 83 and the down pop-up display figure 84 will be described. During execution of the ACC, the CPU executes a "pop-up display end process routine" represented by a flowchart in FIG. 13 every time a predetermined period of time elapses. Accordingly, when a proper timing has come, the CPU starts the process from step 1300 of FIG. 13 and proceeds to step 1305 so as to determine whether or not the up pop-up display figure 83 is currently displayed on the display unit 43.

In the case where the up pop-up display figure 83 is currently displayed, the CPU makes a "Yes" determination in step 1305 and proceeds to step 1310 so as to determine whether or not the first display time Td1 has elapsed since the display of the up pop-up display figure 83 was started. In the case where the first display time Td1 has elapsed since the display of the up pop-up display figure 83 was started, the CPU makes a "Yes" determination in step 1310 and proceeds to step 1315 so as to end the display of the up pop-up display figure 83. Subsequently, the CPU proceeds to step 1395 and ends the present routine.

Notably, the CPU may additionally determine "whether or not the pop-up display has been invalidated" in step 1310 and proceed to step 1315 to end the display of the up pop-up display figure 83 in the case where "the pop-up display has been invalidated." Further, the CPU may additionally determine whether or not the approach warning is currently performed in step 1310 and proceed to step 1315 to end the display of the up pop-up display figure 83 in the case where the approach warning is currently performed.

Meanwhile, in the case where, at the point in time when the CPU executes the process of step 1310, the first display time Td1 has not yet elapsed since the display of the up pop-up display figure 83 was started, the CPU makes a "No" determination in step 1310 and proceeds to step 1320 so as to determine whether or not the up acceptance display figure 81 is currently displayed. The display of the up acceptance display figure 81 is stopped by the processes of step 1110 and step 1115 of FIG. 11 when the speed limit Vlim becomes equal to or less than the set speed Vset or the speed limit Vlim becomes unrecognizable. In this case, since the up acceptance display figure 81 is not currently displayed, the CPU makes a "Yes" determination in step 1320 and proceeds to step 1315 so as to end the display of the up pop-up display figure 83.

In contrast, in the case where the up acceptance display figure 81 is currently displayed, the CPU makes a "No" determination in step 1320 and proceeds directly to the step 1395. Namely, in this case, the display of the up pop-up display figure 83 is continued.

In the case where, the up pop-up display figure 83 is not displayed at the point in time when the CPU executes the process of step 1305, the CPU makes a "No" determination in step 1305 and proceeds to step 1325 so as to determine whether or not the down pop-up display figure 84 is currently displayed. In the case where the down pop-up display figure 84 is currently displayed, the CPU makes a "Yes" determination in step 1325 and proceeds to step 1330 so as to determine whether or not the second display time Td2 has elapsed since the display of the down pop-up display figure 84 was started.

In the case where the second display time Td2 has elapsed since the display of the down pop-up display figure 84 was started, the CPU makes a "Yes" determination in step 1330 and proceeds to step 1335 so as to end the display of the down pop-up display figure 84. Subsequently, the CPU proceeds to step 1395.

Notably, the CPU may additionally determine "whether or not the pop-up display has been invalidated" in step 1330 and proceed to step 1335 to end the display of the down pop-up display figure 84 in the case where "the pop-up display has been invalidated." Further, the CPU may additionally determine whether or not the approach warning is currently performed in step 1330 and proceed to step 1335 to end the display of the down pop-up display figure 84 in the case where the approach warning is currently performed.

Meanwhile, in the case where, at the point in time when the CPU executes the process of step 1330, the second display time Td2 has not yet elapsed since the display of the down pop-up display figure 84 was started, the CPU makes a "No" determination in step 1330 and proceeds to step 1340 so as to determine whether or not the down acceptance display figure 82 is currently displayed. The display of the down acceptance display figure 82 is stopped by the processes of step 1125 and step 1130 of FIG. 11 when the speed limit Vlim becomes equal to or greater than the set speed Vset or the speed limit Vlim becomes unrecognizable. In this case, since the down acceptance display figure 82 is not currently displayed, the CPU makes a "Yes" determination in step 1340 and proceeds to step 1335 so as to end the display of the down pop-up display figure 84.

In contrast, in the case where the down acceptance display figure 82 is currently displayed, the CPU makes a "No" determination in step 1340 and proceeds directly to the step 1395. Namely, in this case, the display of the down pop-up display figure 84 is continued.

As having been described above, when it becomes possible to start the up acceptance operation, in addition to the up acceptance display figure 81, the up pop-up display figure 83 (namely, "the first arrow portion 83*a* having an arrow-like shape" and the first rectangular portion 83*b*) is displayed. Meanwhile, when it becomes possible to start the down acceptance operation, in addition to the down acceptance display figure 82, the down pop-up display figure 84 (namely, "the second arrow portion 84*a* having an arrow-like shape" and the second rectangular portion 84*b*) is displayed. Accordingly, the first apparatus can more certainly inform the driver of the own vehicle 10 of the fact that the driver can start the acceptance operation.

In addition, the red-colored second arrow portion 84*a* is higher in visibility than the blue-colored first arrow portion 83*a*. Further, the down pop-up display figure 84 is displayed for a longer time as compared with the up pop-up display figure 83. Accordingly, the first apparatus can more certainly inform the driver of the down pop-up display figure 84 as compared with the up pop-up display figure 83.

Modification of the First Embodiment

Next, a modification of the first embodiment will be described. In the above-described first embodiment, the set speed display 71 and the speed limit display 72 are displayed on the display unit 43 to be located at positions which are relatively close to each other. In contrast, in the present modification, a set speed display 74 representing the set speed Vset is displayed at a position which is relatively remote from the speed limit display 72. Therefore, the pop-up display in the present modification differs from the pop-up display in the above-described first embodiment. In the following description, this difference will be mainly described.

Figure 14:
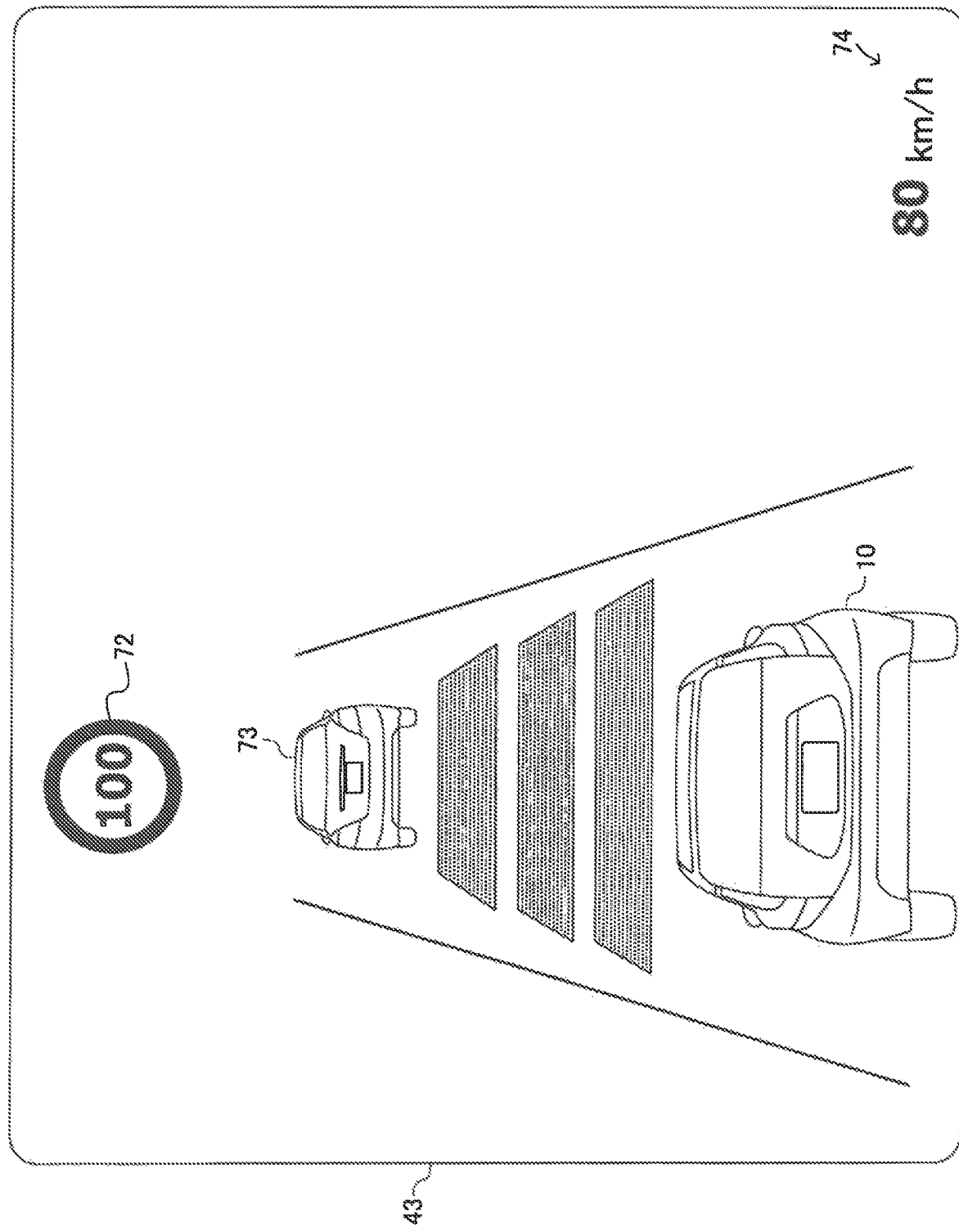
FIG. 14 is an illustration showing an example of a set speed display displayed on a display unit provided in a modification of the first apparatus (first modified display unit)

As shown in FIG. 14, the set speed display 74 in the present modification is displayed in a lower right region of the display unit 43. Meanwhile, the speed limit display 72 is displayed at the same position as that in the first embodiment.

Figure 15:
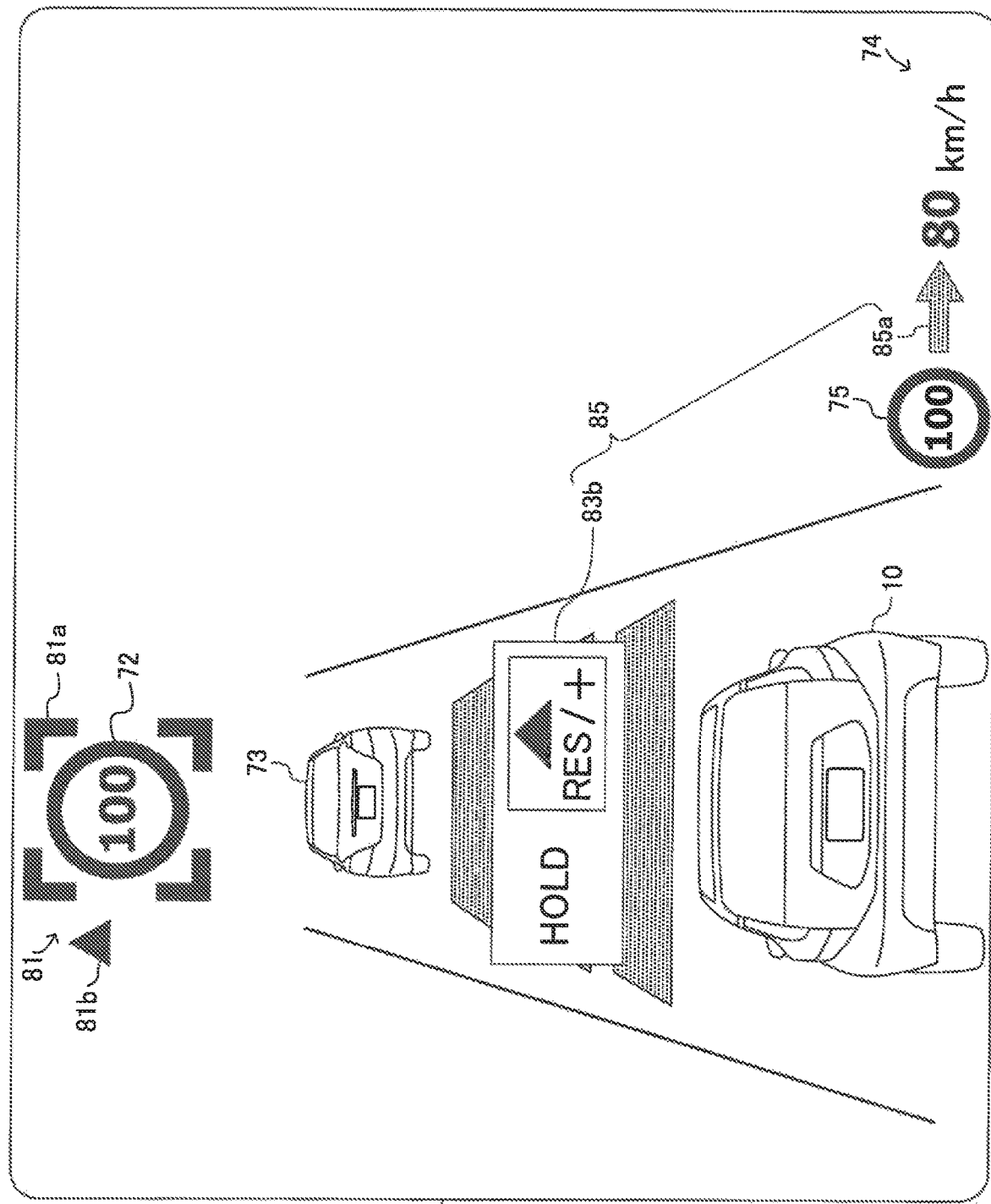
FIG. 15 is an illustration showing an up pop-up display displayed on the first modified display unit.

As shown in FIG. 15, the drive assist ECU 21 displays the up acceptance display figure 81 and an up pop-up display figure 85 on the display unit 43 in the case where the ACC is currently executed and when the long press operation of the acceleration switch 52 is performed, both Condition 3 and Condition 4 are satisfied and the up acceptance process is executed. The up pop-up display figure 85 includes the first rectangular portion 83*b*, "a secondary speed limit display 75 representing the speed limit Vlim," and "a first arrow portion 85*a* extending from the secondary speed limit display 75 toward the set speed display 74."

Figure 16:
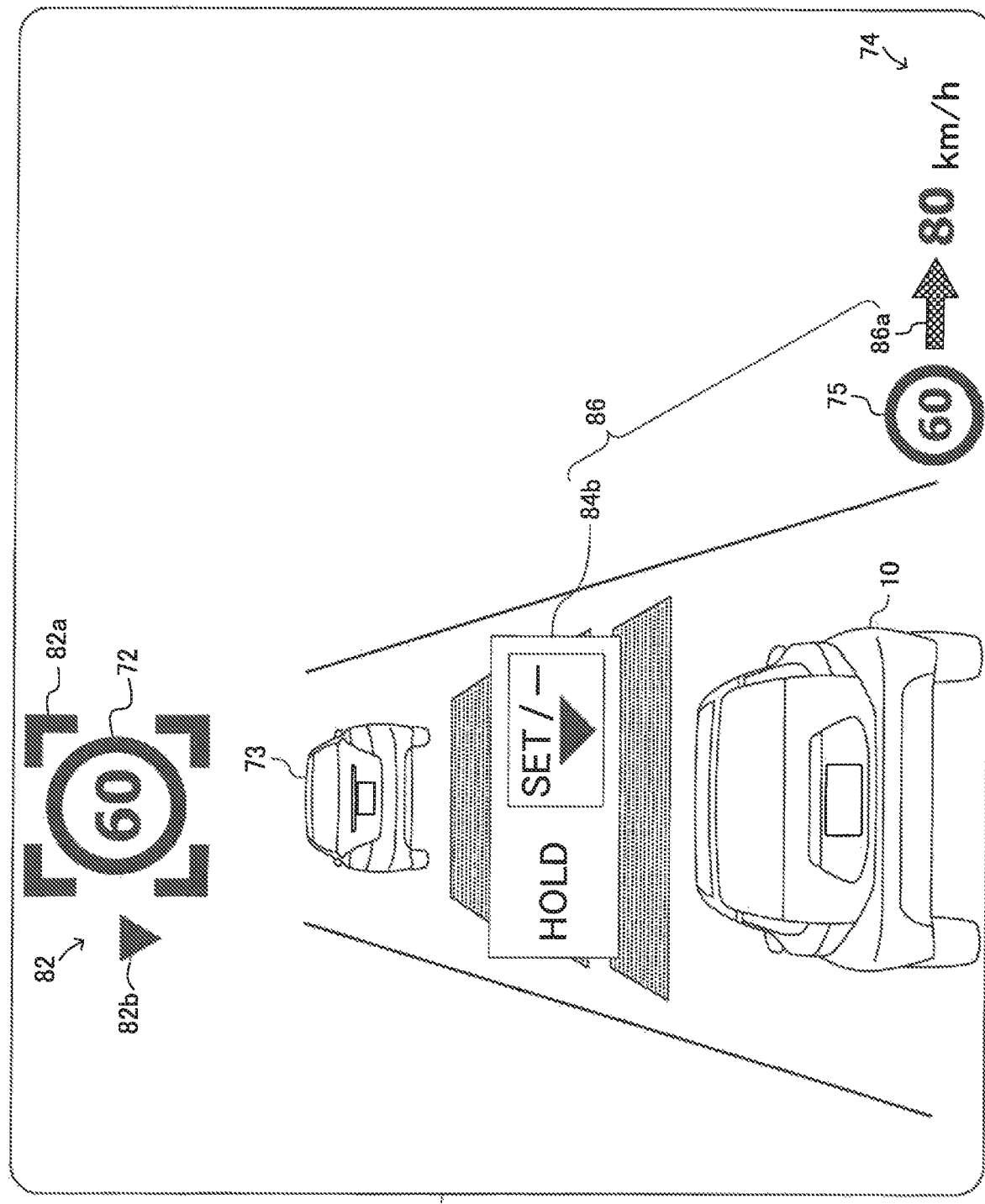
FIG. 16 is an illustration showing a down pop-up display displayed on the first modified display unit.

Meanwhile, as shown in FIG. 16, the drive assist ECU 21 displays the down acceptance display figure 82 and a down pop-up display figure 86 on the display unit 43 in the case where the ACC is currently executed and when the long press operation of the deceleration switch 53 is performed, both Condition 7 and Condition 8 are satisfied and the down acceptance process is executed. The down pop-up display figure 86 includes the second rectangular portion 84*b*, the secondary speed limit display 75, and "a second arrow portion 86*a* extending from the secondary speed limit display 75 toward the set speed display 74."

In the present modification, the first arrow portion 85*a* of the up pop-up display figure 85 is blue-colored, and the second arrow portion 86*a* of the down pop-up display figure 86 is red-colored. The first arrow portion 85*a* will also be referred to as the "first additional display" for convenience, and the second arrow portion 86*a* will also be referred to as the "second additional display" for convenience. The position at which the first arrow portion 85*a* is displayed and the position at which the second arrow portion 86*a* is displayed will also be referred to as the "third position" for convenience.

Second Embodiment

Next, a vehicle travel control apparatus according to a second embodiment of the present invention (hereinafter also referred to as the "second apparatus") will be described. The drive assist ECU 21 according to the above-described first embodiment displays the set speed display 71, the speed limit display 72, the up acceptance display figure 81 and the down acceptance display figure 82 on the display unit 43 together with "the figures representing the own vehicle 10 and the to-be-followed vehicle 73." In contrast, a drive assist ECU 22 according to the second embodiment displays these items on a speed meter 44. In the following description, this difference will be mainly described.

Figure 17:
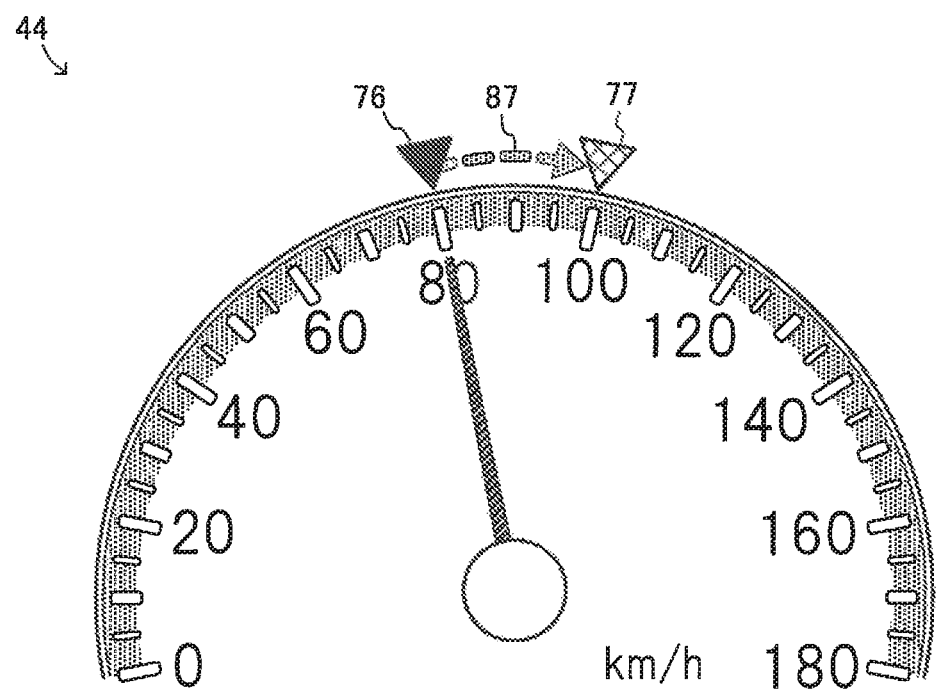
FIG. 17 is an illustration showing an up acceptance display and examples of a set speed display and a speed limit display which are displayed on a speed meter (second display unit) provided in a vehicle travel control apparatus (second apparatus) according to a second embodiment of the present invention.

The speed meter 44 is disposed on the dash board (not shown) of the own vehicle 10. Namely, the speed meter 44 is provided at a position determined such that the driver can view the items displayed on the speed meter 44. The speed meter 44 is composed of a liquid crystal display which displays characters, symbols, etc. in accordance with an instruction from the drive assist ECU 22. FIG. 17 shows a display example of the speed meter 44. In the example of FIG. 17, the vehicle speed Vs is about 80 km/h, the set speed Vset is 80 km/h, and the speed limit Vlim is 100 km/h. Namely, the speed limit Vlim is greater than the set speed Vset.

In this case, the drive assist ECU 22 displays, as a set speed display 76, a triangular mark which is directed toward a position on the dial of the speed meter 44 which corresponds to 80 km/h (position at which the needle of the speed meter 44 is located when the vehicle speed Vs is 80 km/h). In addition, the drive assist ECU 22 displays, as a speed limit display 77, a triangular mark which is directed toward a position on the dial of the speed meter 44 which corresponds to 100 km/h. The position on the speed meter 44 which corresponds to the set speed Vset and at which the set speed display 76 is displayed will be also referred to as the "first position" for convenience. The position on the speed meter 44 which corresponds to the speed limit Vlim and at which the speed limit display 77 is displayed will be also referred to as the "second position" for convenience.

The drive assist ECU 22 displays an up acceptance display figure 87 on the speed meter 44 in the case where the ACC is currently executed and when the long press operation of the acceleration switch 52 is performed, both Condition 3 and Condition 4 are satisfied and the up acceptance process is executed. The up acceptance display figure 87 includes an arrow-like figure extending from the set speed display 76 toward the speed limit display 77.

Figure 18:
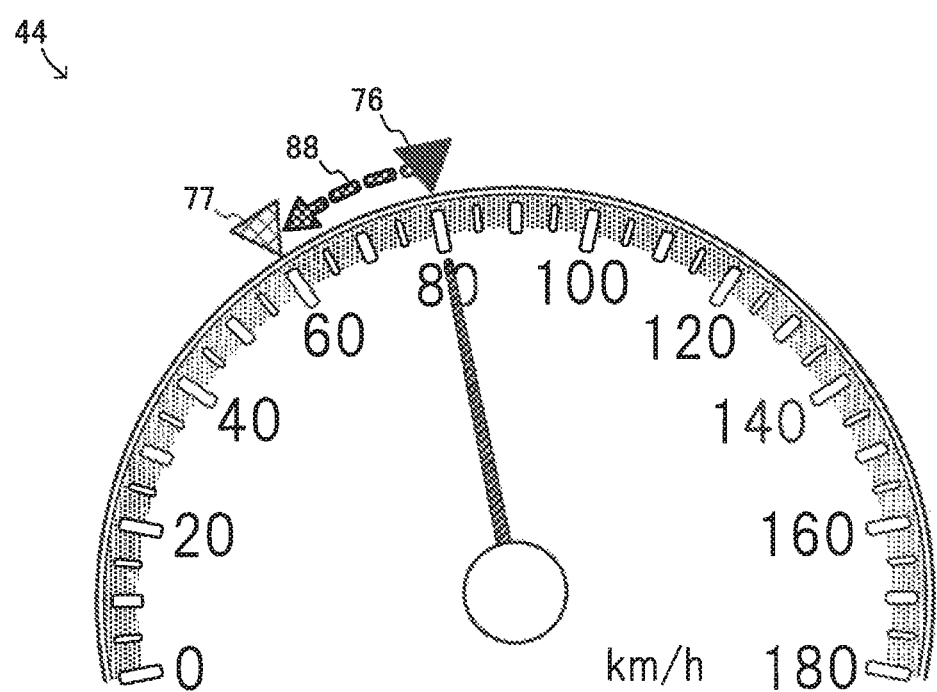
FIG. 18 is an illustration showing a down acceptance display and examples of the set speed display and the speed limit display displayed on the second display unit.

Meanwhile, FIG. 18 shows a display example of the speed meter 44 for the case where the speed limit Vlim is less than the set speed Vset. In the example of FIG. 18, the vehicle speed Vs is about 80 km/h, the set speed Vset is 80 km/h, and the speed limit Vlim is 60 km/h. In this case, the drive assist ECU 22 displays, as the speed limit display 77, a triangular mark which is directed toward a position on the dial of the speed meter 44 which corresponds to 60 km/h.

The drive assist ECU 22 displays a down acceptance display figure 88 on the speed meter 44 in the case where the ACC is currently executed and when the long press operation of the deceleration switch 53 is performed, both Condition 7 and Condition 8 are satisfied and the down acceptance process is executed. The down acceptance display figure 88 includes an arrow-like figure extending from the set speed display 76 toward the speed limit display 77.

In the present embodiment, the up acceptance display figure 87 is blue-colored, and the down acceptance display figure 88 is red-colored. The up acceptance display figure 87 will also be referred to as the "first additional display" for convenience. The down acceptance display figure 88 will also be referred to as the "second additional display" for convenience.

(Specific Operation)

Next, specific operation of the drive assist ECU 22 will be described. Since the "set speed change process routine" and the "acceptance display start process routine" executed by the drive assist ECU 22 are the same as those executed by the drive assist ECU 21 of the first embodiment, their descriptions are omitted. The drive assist ECU 22 does not perform the "pop-up display start process routine" and the "pop-up display end process routine."

Figure 11:
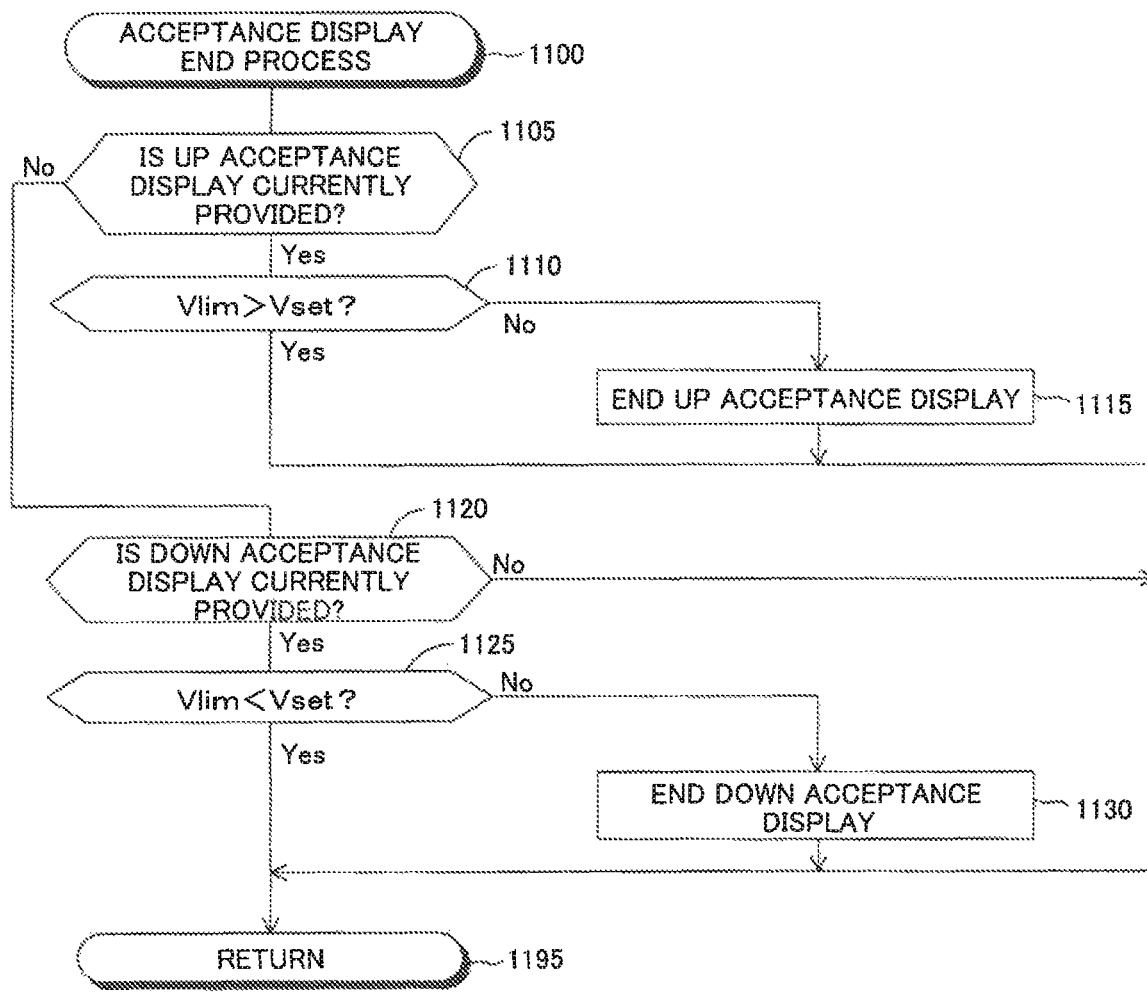
FIG. 11 is a flowchart representing an acceptance display end process routine executed by the first apparatus.

Therefore, the "acceptance display end process routine" executed by the drive assist ECU 22 will now be described. During execution of the ACC, the CPU of the drive assist ECU 22 (hereinafter also referred to as "CPU" for simplification) executes the "acceptance display end process routine" represent by a flowchart in FIG. 19 every time a predetermined period of time elapses. Notably, of the steps shown in the flowchart of FIG. 19, steps in which the same processes as those of the steps shown in the flowchart of FIG. 11 are performed are denoted by the same step numbers as those used in FIG. 11.

Figure 19:
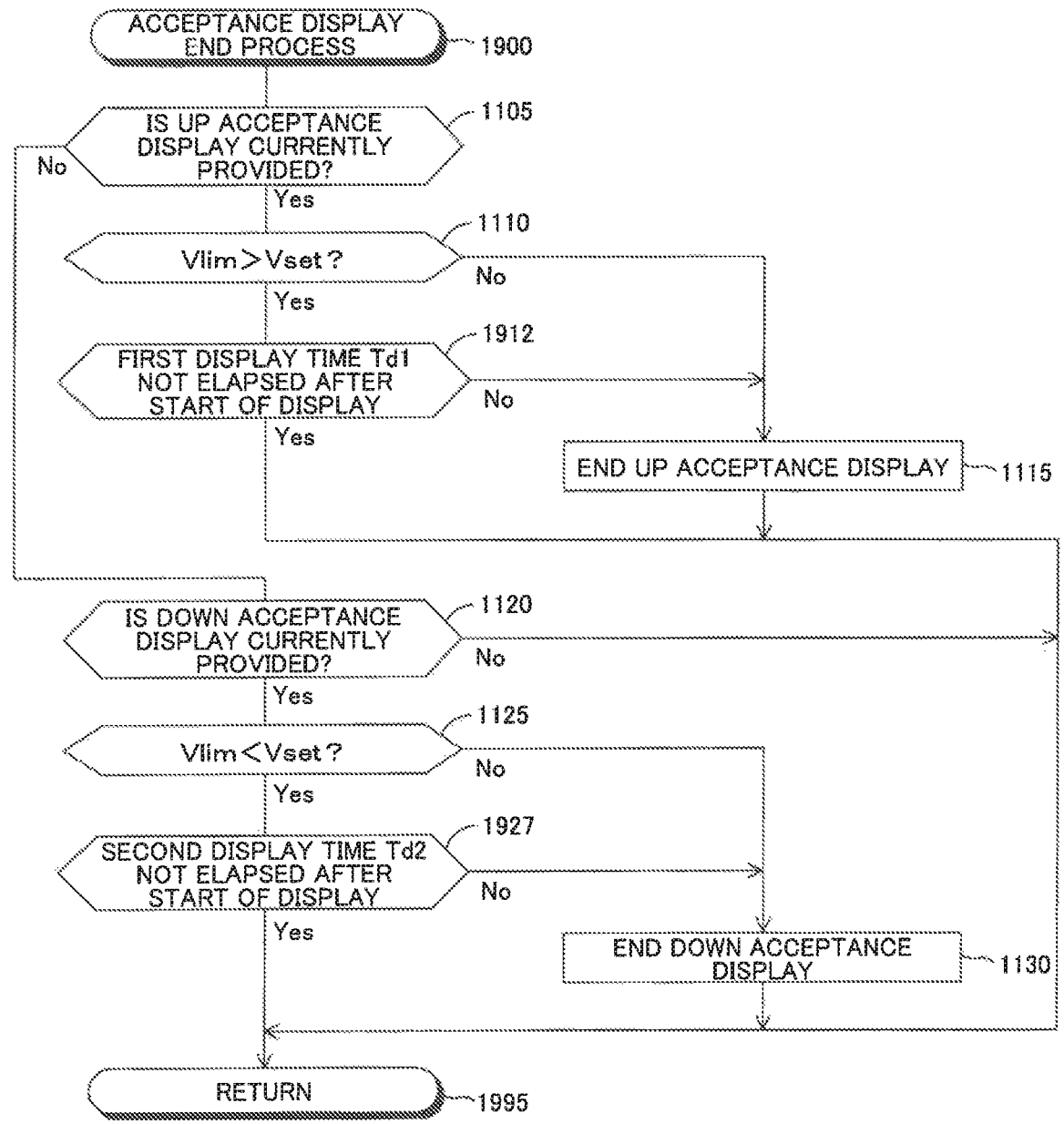
FIG. 19 is a flowchart representing an acceptance display end process routine executed by the second apparatus.

Accordingly, when a proper timing has come, the CPU starts the process from step 1900 of FIG. 19 and proceeds to step 1105. In the case where the CPU makes a "Yes" determination in step 1110, the CPU proceeds to step 1912 so as to determine whether or not the first display time Td1 has elapsed since the display of the up acceptance display figure 87 was started.

In the case where the first display time Td1 has elapsed since the display of the up acceptance display figure 87 was started, the CPU makes a "No" determination in step 1912 and proceeds to step 1115. Meanwhile, in the case where the first display time Td1 has not yet elapsed since the display of the up acceptance display figure 87 was started, the CPU makes a "Yes" determination in step 1912 and proceeds directly to step 1995 so as to end the present routine.

In the case where the CPU makes a "Yes" determination in step 1125, the CPU proceeds to step 1927 so as to determine whether or not the second display time Td2 has elapsed since the display of the down acceptance display figure 88 was started.

In the case where the second display time Td2 has elapsed since the display of the down acceptance display figure 88 was started, the CPU makes a "No" determination in step 1927 and proceeds to step 1130. Meanwhile, in the case where the second display time Td2 has not yet elapsed since the display of the down acceptance display figure 88 was started, the CPU makes a "Yes" determination in step 1927 and proceeds directly to step 1995.

Notably, after execution of the process of step 1115 and after execution of the process of step 1130, the CPU proceeds to step 1995. In addition, in the case where the CPU makes a "No" determination in step 1120, the CPU proceeds to step 1995.

As having been described above, according to the second apparatus, when it becomes possible to start the up acceptance operation, the up acceptance display figure 87 (namely, an arrow-like figure extending from the set speed display 76 to the speed limit display 77) is displayed. Meanwhile, when it becomes possible to start the down acceptance operation, the down acceptance display figure 88 (namely, an arrow-like figure extending from the set speed display 76 to the speed limit display 77) is displayed. Accordingly, the second apparatus can more certainly inform the driver of the own vehicle 10 of the fact that the driver can start the acceptance operation.

In addition, the red-colored down acceptance display figure 88 is higher in visibility than the blue-colored up acceptance display figure 87. Further, the down acceptance display figure 88 is displayed for a longer time as compared with the up acceptance display figure 87. Accordingly, the second apparatus can more certainly inform the driver of the down acceptance display figure 88 as compared with the up acceptance display figure 87.

Further, according to the second apparatus, even in the case where the own vehicle 10 does not have the "display unit 43 of the first apparatus," it is possible to inform the driver of the own vehicle 10 of the fact that the driver can start the acceptance operation.

While the embodiments of the vehicle travel control apparatus of the present invention have been described, the present invention is not limited to the above-described embodiments and may be embodied in various forms without departing from the scope of the invention. For example, the drive assist ECUs of the embodiments acquire the speed limit Vlim from the image processing ECU 33. However, the drive assist ECUs may acquire the speed limit Vlim by a different method. For example, the drive assist ECUs may include a GPS (global positioning system) reception section for obtaining the present position of the own vehicle 10 and a map data base which contains information representing the speed limits of various roads, and may be configured to obtain the speed limit Vlim by applying the present position to the map data base. Alternatively, the drive assist ECUs of the embodiments may be configured to obtain the speed limit Vlim on the basis of both the speed limit acquired by applying the present position to the map data base and the speed limit acquired from the image processing ECU 33.

In the embodiments, the first additional display is blue-colored, and the second additional display is red-colored.

However, the first additional display may have a color other than blue, and the second additional display may have a color other than red.

In the embodiments, the display of the first additional display is ended after elapse of the first display time Td1, the display of the second additional display is ended after elapse of the second display time Td2. However, these processes may be omitted. Namely, the display of the first additional display and the second additional display may be continued so long as the acceptance operation executable state continues.

In the own vehicles 10 of the embodiments, the main switch 51, the acceleration switch 52, the deceleration switch 53, and the cancel switch 54 are disposed on the operation lever 50. However, these switches may be disposed at a location other than the operation lever 50. For example, these switches may be disposed on the front side (side which faces the driver) of the steering wheel of the own vehicle 10.

In the case where Condition 3 and Condition 4 are both satisfied, the drive assist ECUs of the embodiments determine that the long press operation of the acceleration switch 52 has been performed during the period during which the speed limit Vlim was greater than the set speed Vset, and executes the up acceptance process. However, the drive assist ECUs may be configured to execute the up acceptance process when the state in which the speed limit Vlim is greater than the set speed Vset actually continues since the acceleration switch 52 was switched from the OFF state to the ON state until the ON state of the acceleration switch 52 continues for the long press time Tlp. Similarly, the drive assist ECUs may be configured to execute the down acceptance process when the state in which the speed limit Vlim is less than the set speed Vset actually continues since the deceleration switch 53 was switched from the OFF state to the ON state until the ON state of the deceleration switch 53 continues for the long press time Tlp.

The drive assist ECUs of the embodiments execute the up acceptance process if Condition 3 and Condition 4 are both satisfied when the long press operation of the acceleration switch 52 is performed. Further, the drive assist ECUs of the embodiments execute the down acceptance process if Condition 7 and Condition 8 are both satisfied when the long press operation of the deceleration switch 53 is performed. However, the drive assist ECUs of the embodiments may be configured to determine whether to execute the acceptance process on the basis of conditions different from these conditions. For example, the drive assist ECUs of the embodiments may be configured execute the acceptance process when a short press operation of the deceleration switch 53 is performed before elapse of a predetermined period of time after the speed limit Vlim was newly acquired. The condition for determining whether to execute the acceptance process (namely, the condition that the short press operation of the deceleration switch 53 is performed before elapses of the predetermined period of time after the speed limit Vlim was newly acquired) in this case will also be referred to as the "specific condition" for convenience.

The drive assist ECUs may be configured to execute the up acceptance process if Condition 3 is satisfied when the long press operation of the acceleration switch 52 is performed, even when Condition 4 is not satisfied. Similarly, the drive assist ECUs may be configured to execute the down acceptance process if Condition 7 is satisfied when the long press operation of the deceleration switch 53 is performed, even when Condition 8 is not satisfied.

The additional displays (namely, the first arrow portion 83a and the second arrow portion 84a, and the first arrow portion 85a and the second arrow portion 86a) in the embodiments each have an arrow-like shape. However, some or all of the additional displays may have a shape other than the arrow-like shape. For example, each of these additional displays may be a single triangular mark provided between the speed limit display (the speed limit display 72 and the speed limit display 77) and the set speed display (the set speed display 74 and the set speed display 76) and directed toward the set speed display.

The up pop-up display figure 83 includes the first arrow portion 83a and the first rectangular portion 83b. However, the up pop-up display figure 83 is not required to include the first rectangular portion 83b. Similarly, the down pop-up display figure 84 includes the second arrow portion 84a and the second rectangular portion 84b. However, the down pop-up display figure 84 is not required to include the second rectangular portion 84b.

The drive assist ECU 21 of the first embodiment displays the own vehicle 10 and the to-be-followed vehicle 73 on the display unit 43. However, the display of the own vehicle 10 and the to-be-followed vehicle 73 may be omitted.

In the embodiments, each of the long press time Tlp1, the long press time Tlp2, and the interval time Tin is 0.6 sec, the first speed change amount Vc1 is 1 km/h, the second speed change amount Vc2 is 5 km/h, the first display time Td1 is 5 sec, and the second display time Td2 is 10 sec. However, some or all of the long press time Tlp1, the long press time Tlp2, the interval time Tin, the first speed change amount Vc1, the second speed change amount Vc2, the first display time Td1, and the second display time Td2 may have values different from those employed in the embodiments.

What is claimed is:

1. A vehicle travel control apparatus comprising:
   a braking and driving force control section which controls driving and braking forces of an own vehicle such that a travel speed of said own vehicle coincides with a set speed set by a driver of said own vehicle;
   an operation section configured to allow said driver to change a state of said operation section between an OFF state in which said operation section is not operated and an ON state in which said operation section is operated;
   a speed limit acquisition section which acquires a speed limit of a road on which said own vehicle travels;
   an acceptance process execution section which executes an acceptance process for rendering said set speed coincident with said speed limit, upon completion of a predetermined acceptance operation including an OFF to ON operation of changing the state of said operation section from said OFF state to said ON state;
   a display section which provides a set speed display representing said set speed at a first position viewable by said driver and provides a speed limit display representing said speed limit at a second position viewable by said driver; and
   a display control section which causes said display section to provide said set speed display at the first position and said speed limit display at the second position, wherein:
   said acceptance process execution section executes said acceptance process upon completion of said acceptance operation in the case where a predetermined specific condition is satisfied at a point in time when said OFF to ON operation is performed;
   said display section provides an additional display at a third position between said first position and said second position, which is viewable by said driver, such that the additional display is provided between the set speed display and the speed limit display, said additional display representing that said acceptance operation can be performed; and said display control section causes said display section to start said additional display when said operation section is in said OFF state and said specific condition is satisfied if the state of said operation section is changed to said ON state.

2. The vehicle travel control apparatus according to claim 1, wherein
said display section provides said additional display by providing a display including an arrow-like figure extending from said second position at which said speed limit display is provided toward said first position at which said set speed display is provided.

3. The vehicle travel control apparatus according to claim 1, wherein:
said operation section includes an acceleration switch whose state can be changed between a first OFF state corresponding to said OFF state and a first ON state corresponding to said ON state, and a deceleration switch whose state can be changed between a second OFF state corresponding to said OFF state and a second ON state corresponding to said ON state;
said acceptance process execution section executes said acceptance process in the case where an up acceptance operation corresponding to said acceptance operation is started at a first point in time when the state of the acceleration switch is changed from said first OFF state to said first ON state and is completed at a second point in time until which said first ON state is continued for a predetermined first long press time after said first point in time, provided that a first specific condition that said speed limit is greater than said set speed and that corresponds to said specific condition is satisfied at said first point in time and the condition that said speed limit is greater than said set speed is also satisfied at said second point in time;
said acceptance process execution section executes said acceptance process in the case where a down acceptance operation corresponding to said acceptance operation is started at a third point in time when the state of the deceleration switch is changed from said second OFF state to said second ON state and is completed at a fourth point in time until which said second ON state is continued for a predetermined second long press time after said third point in time, provided that a second specific condition that said speed limit is less than said set speed and that corresponds to said specific condition is satisfied at said third point in time and the condition that said speed limit is less than said set speed is also satisfied at said fourth point in time;
said display section can provide first and second additional displays as said additional display; and
said display control section causes said display section to start said first additional display when said acceleration switch is in said first OFF state and said first specific condition is satisfied if the state of said acceleration switch is changed to said first ON state, and causes said display section to start said second additional display when said deceleration switch is in said second OFF state and said second specific condition is satisfied if the state of said deceleration switch is changed to said second ON state.

4. The vehicle travel control apparatus according to claim 2, wherein:
said operation section includes an acceleration switch whose state can be changed between a first OFF state corresponding to said OFF state and a first ON state corresponding to said ON state, and a deceleration switch whose state can be changed between a second OFF state corresponding to said OFF state and a second ON state corresponding to said ON state;
said acceptance process execution section executes said acceptance process in the case where an up acceptance operation corresponding to said acceptance operation is started at a first point in time when the state of the acceleration switch is changed from said first OFF state to said first ON state and is completed at a second point in time until which said first ON state is continued for a predetermined first long press time after said first point in time, provided that a first specific condition that said speed limit is greater than said set speed and that corresponds to said specific condition is satisfied at said first point in time and the condition that said speed limit is greater than said set speed is also satisfied at said second point in time;
said acceptance process execution section executes said acceptance process in the case where a down acceptance operation corresponding to said acceptance operation is started at a third point in time when the state of the deceleration switch is changed from said second OFF state to said second ON state and is completed at a fourth point in time until which said second ON state is continued for a predetermined second long press time after said third point in time, provided that a second specific condition that said speed limit is less than said set speed and that corresponds to said specific condition is satisfied at said third point in time and the condition that said speed limit is less than said set speed is also satisfied at said fourth point in time;
said display section can provide first and second additional displays as said additional display; and
said display control section causes said display section to start said first additional display when said acceleration switch is in said first OFF state and said first specific condition is satisfied if the state of said acceleration switch is changed to said first ON state, and causes said display section to start said second additional display when said deceleration switch is in said second OFF state and said second specific condition is satisfied if the state of said deceleration switch is changed to said second ON state.

5. The vehicle travel control apparatus according to claim 3, wherein
said display control section ends said first additional display when a predetermined first display time elapses after start of said first additional display, and ends said second additional display when a predetermined second display time longer than said first display time elapses after start of said second additional display.

6. The vehicle travel control apparatus according to claim 4, wherein
said display control section ends said first additional display when a predetermined first display time elapses after start of said first additional display, and ends said second additional display when a predetermined second display time longer than said first display time elapses after start of said second additional display.

7. The vehicle travel control apparatus according to claim 3, wherein
said display section provides said first additional display and said second additional display by using colors different from each other.

8. The vehicle travel control apparatus according to claim 4, wherein
said display section provides said first additional display and said second additional display by using colors different from each other.

9. The vehicle travel control apparatus according to claim 5, wherein
said display section provides said first additional display and said second additional display by using colors different from each other.

10. The vehicle travel control apparatus according to claim 6, wherein
said display section provides said first additional display and said second additional display by using colors different from each other.

11. The vehicle travel control apparatus according to claim 1, wherein:
said display section employs, as said first position, a position on an analog speed meter provided in said own vehicle and having scale lines indicating vehicle speed, the position specifying one of the scale lines which corresponds to said set speed, and performs said set speed display by displaying at said first position a first mark which specifies the scale line corresponding to said set speed; and
said display section employs, as said second position, a position on the speed meter having the scale lines indicating vehicle speed, the position specifying one of the scale lines which corresponds to said speed limit, and performs said speed limit display by displaying at said second position a second mark which specifies the scale line corresponding to said speed limit.

12. The vehicle travel control apparatus according to claim 2, wherein:
said display section employs, as said first position, a position on an analog speed meter provided in said own vehicle and having scale lines indicating vehicle speed, the position specifying one of the scale lines which corresponds to said set speed, and performs said set speed display by displaying at said first position a first mark which specifies the scale line corresponding to said set speed; and
said display section employs, as said second position, a position on the speed meter having the scale lines indicating vehicle speed, the position specifying one of the scale lines which corresponds to said speed limit, and performs said speed limit display by displaying at said second position a second mark which specifies the scale line corresponding to said speed limit.

13. The vehicle travel control apparatus according to claim 3, wherein:
said display section employs, as said first position, a position on an analog speed meter provided in said own vehicle and having scale lines indicating vehicle speed, the position specifying one of the scale lines which corresponds to said set speed, and performs said set speed display by displaying at said first position a first mark which specifies the scale line corresponding to said set speed; and
said display section employs, as said second position, a position on the speed meter having the scale lines indicating vehicle speed, the position specifying one of the scale lines which corresponds to said speed limit, and performs said speed limit display by displaying at said second position a second mark which specifies the scale line corresponding to said speed limit.

14. The vehicle travel control apparatus according to claim 4, wherein:
said display section employs, as said first position, a position on an analog speed meter provided in said own vehicle and having scale lines indicating vehicle speed, the position specifying one of the scale lines which corresponds to said set speed, and performs said set speed display by displaying at said first position a first mark which specifies the scale line corresponding to said set speed; and
said display section employs, as said second position, a position on the speed meter having the scale lines indicating vehicle speed, the position specifying one of the scale lines which corresponds to said speed limit, and performs said speed limit display by displaying at said second position a second mark which specifies the scale line corresponding to said speed limit.

15. The vehicle travel control apparatus according to claim 5, wherein:
said display section employs, as said first position, a position on an analog speed meter provided in said own vehicle and having scale lines indicating vehicle speed, the position specifying one of the scale lines which corresponds to said set speed, and performs said set speed display by displaying at said first position a first mark which specifies the scale line corresponding to said set speed; and
said display section employs, as said second position, a position on the speed meter having the scale lines indicating vehicle speed, the position specifying one of the scale lines which corresponds to said speed limit, and performs said speed limit display by displaying at said second position a second mark which specifies the scale line corresponding to said speed limit.

16. The vehicle travel control apparatus according to claim 6, wherein:
said display section employs, as said first position, a position on an analog speed meter provided in said own vehicle and having scale lines indicating vehicle speed, the position specifying one of the scale lines which corresponds to said set speed, and performs said set speed display by displaying at said first position a first mark which specifies the scale line corresponding to said set speed; and
said display section employs, as said second position, a position on the speed meter having the scale lines indicating vehicle speed, the position specifying one of the scale lines which corresponds to said speed limit, and performs said speed limit display by displaying at said second position a second mark which specifies the scale line corresponding to said speed limit.

17. The vehicle travel control apparatus according to claim 7, wherein:
said display section employs, as said first position, a position on an analog speed meter provided in said own vehicle and having scale lines indicating vehicle speed, the position specifying one of the scale lines which corresponds to said set speed, and performs said set speed display by displaying at said first position a first mark which specifies the scale line corresponding to said set speed; and
said display section employs, as said second position, a position on the speed meter having the scale lines indicating vehicle speed, the position specifying one of the scale lines which corresponds to said speed limit, and performs said speed limit display by displaying at said second position a second mark which specifies the scale line corresponding to said speed limit.

18. The vehicle travel control apparatus according to claim 8, wherein:
said display section employs, as said first position, a position on an analog speed meter provided in said own vehicle and having scale lines indicating vehicle speed, the position specifying one of the scale lines which corresponds to said set speed, and performs said set speed display by displaying at said first position a first mark which specifies the scale line corresponding to said set speed; and
said display section employs, as said second position, a position on the speed meter having the scale lines indicating vehicle speed, the position specifying one of the scale lines which corresponds to said speed limit, and performs said speed limit display by displaying at said second position a second mark which specifies the scale line corresponding to said speed limit.

19. The vehicle travel control apparatus according to claim 9, wherein:
said display section employs, as said first position, a position on an analog speed meter provided in said own vehicle and having scale lines indicating vehicle speed, the position specifying one of the scale lines which corresponds to said set speed, and performs said set speed display by displaying at said first position a first mark which specifies the scale line corresponding to said set speed; and
said display section employs, as said second position, a position on the speed meter having the scale lines indicating vehicle speed, the position specifying one of the scale lines which corresponds to said speed limit, and performs said speed limit display by displaying at said second position a second mark which specifies the scale line corresponding to said speed limit.

20. The vehicle travel control apparatus according to claim 10, wherein:
said display section employs, as said first position, a position on an analog speed meter provided in said own vehicle and having scale lines indicating vehicle speed, the position specifying one of the scale lines which corresponds to said set speed, and performs said set speed display by displaying at said first position a first mark which specifies the scale line corresponding to said set speed; and
said display section employs, as said second position, a position on the speed meter having the scale lines indicating vehicle speed, the position specifying one of the scale lines which corresponds to said speed limit, and performs said speed limit display by displaying at said second position a second mark which specifies the scale line corresponding to said speed limit.

* * * * *